United States Patent
Sakakima

(10) Patent No.: US 11,250,619 B2
(45) Date of Patent: Feb. 15, 2022

(54) IMAGE PROCESSING APPARATUS AND METHOD

(71) Applicant: CANON KABUSHIKI KAISHA, Tokyo (JP)

(72) Inventor: Eito Sakakima, Kamakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/425,814

(22) Filed: May 29, 2019

(65) Prior Publication Data

US 2019/0279418 A1 Sep. 12, 2019

Related U.S. Application Data

(63) Continuation of application No. PCT/JP2017/038605, filed on Oct. 26, 2017.

(30) Foreign Application Priority Data

Nov. 30, 2016 (JP) .............................. JP2016-233500
Jun. 27, 2017 (JP) .............................. JP2017-125592

(51) Int. Cl.
*G06T 15/20* (2011.01)
*G06T 17/00* (2006.01)
*H04N 7/18* (2006.01)

(52) U.S. Cl.
CPC ............ *G06T 15/205* (2013.01); *G06T 15/20* (2013.01); *G06T 17/00* (2013.01); *H04N 7/18* (2013.01);
(Continued)

(58) Field of Classification Search
None
See application file for complete search history.

(56) References Cited

U.S. PATENT DOCUMENTS

| 2002/0061131 A1 | 5/2002 | Sawhney et al. |
| 2013/0321396 A1 | 12/2013 | Kirk et al. |
| 2015/0138188 A1* | 5/2015 | Gillard ................... G09G 5/377 |
| | | 345/419 |
| 2016/0092736 A1* | 3/2016 | Mai ...................... G06K 9/4604 |
| | | 382/103 |

(Continued)

FOREIGN PATENT DOCUMENTS

| JP | H11-259672 A | 9/1999 |
| JP | H11-259685 A | 9/1999 |

(Continued)

OTHER PUBLICATIONS

F. Gu, T. Nakata and Y. Bao, "A method for generating and displaying a free view 3D image", SICE Annual Conference 2011, Tokyo, 2011, pp. 277-282. (Year: 2011).*

(Continued)

*Primary Examiner* — James A Thompson
(74) *Attorney, Agent, or Firm* — Canon U.S.A., Inc. IP Division

(57) ABSTRACT

An image processing apparatus that generates a virtual viewpoint image: obtains information related to installation of cameras for capturing images used for generating a virtual viewpoint image and viewpoint information related to a virtual viewpoint; determines based on the information related to installation of the cameras and the viewpoint information an image processing method to be used for generating a virtual viewpoint image; and generates the virtual viewpoint image corresponding to the virtual viewpoint by using the determined image processing method.

15 Claims, 19 Drawing Sheets

(52) U.S. Cl.
CPC ............... *G06T 2207/10004* (2013.01); *G06T 2207/30228* (2013.01)

(56) References Cited

U.S. PATENT DOCUMENTS

| | | | | |
|---|---|---|---|---|
| 2016/0198146 A1* | 7/2016 | Hayasaka | ................. | G06T 5/50 348/48 |
| 2018/0258616 A1* | 9/2018 | Kiyota | ...................... | G06T 1/20 |
| 2018/0316902 A1* | 11/2018 | Tanaka | .................. | H04N 19/44 |
| 2019/0206014 A1* | 7/2019 | Furukawa | ............... | G06T 15/00 |
| 2020/0051323 A1* | 2/2020 | Araki | .................... | G06T 15/205 |

FOREIGN PATENT DOCUMENTS

| | | |
|---|---|---|
| JP | 2004086508 A | 3/2004 |
| JP | 2009064445 A | 3/2009 |
| JP | 2015225529 A | 12/2015 |
| JP | 2015231114 A | 12/2015 |
| WO | 2015/054235 A1 | 4/2015 |

OTHER PUBLICATIONS

"Arbitrary Viewpoint Video Synthesis From Multiple Uncalibrated Cameras", by Satoshi Yaguchi and Hideo Saito, IEEE Transactions on Systems, Man, and Cybernetics, vol. 34, No. 1, Feb. 2004, pp. 430-439. (Year: 2004).*
Hidetoshi Shinohara; A Walkthrough Environment by a Combination of IBR and MBR; Information Processing Society of Japan SIG Notes, Jan. 17, 2003, vol. 2003, No. 2, p. 147-154.
Ryo Sato et al; Driving Simulator System based on Image-based Rendering Technique using Car-mounted Omni-video; The Institute of Electronics, Informatin and Communication Engineers Technical Report, Jun. 11, 2009, vol. 109, No. 88, p. 1-6.
Sekitoh M, et al., Arbitrary View Image Generation by Model-Based Interpolation in the Ray-Space, Proceedings of SPIE/ IS & T, vol. 4660, Jan. 21, 2002, pp. 465-474, XP008021233.
Ortiz-Cayon Rodrigo et al., A Bayesian Approach for Selective Image-Based Rendering Using Superpixels, 2015 International Conference on 3D Vision, IEEE, Oct. 19, 2015, pp. 469-477, XP032819121.
Kang S B, A Survey of Image-based Rendering Techniques, CRL Technical Report, Internet Citation, Aug. 1, 1997, pp. 1-37, Cambridge Research Laboratory, Cambridge, Massachusets, XP002508149.
J. -F. Evers-Senne, et al., Image-Based Rendering of Complex Scenes from a Multi-Camera Rig, IEE Proceedings, Vision, Image and Signal Processing, vol. 152, No. 4, Jan. 1, 2005, p. 470, XP055499815.
H. Saito et al., Appearance-based Virtual View Generation from Multicamera Videos Captured in the 3-D Room, IEEE Transactions on Multimedia, vol. 5, No. 3, Sep. 1, 2003, pp. 303-316, XP055109708.

* cited by examiner

| DETERMINATION CONDITION | IMAGE GENERATION METHOD |
|---|---|
| ANGLE θ < 10° | IMAGE-BASED RENDERING |
| OTHER | MODEL-BASED RENDERING |

5B

| DETERMINATION CONDITION | TYPE OF OBJECT | IMAGE GENERATION METHOD |
|---|---|---|
| ANGLE θ < 5° | — | IMAGE-BASED RENDERING |
| 5° ≤ θ < 10° | SIMPLE | IMAGE-BASED RENDERING |
| 5° ≤ θ < 10° | PLURALITY | MODEL-BASED RENDERING |
| OTHER | — | MODEL-BASED RENDERING |

FIG. 7

| DETERMINATION CONDITION | IMAGE GENERATION METHOD |
|---|---|
| COVERAGE RATIO OF GAZE POINT REGION IN IMAGE > 80% | MODEL-BASED RENDERING |
| OTHER | IMAGE-BASED RENDERING |

# IMAGE PROCESSING APPARATUS AND METHOD

CROSS-REFERENCE TO RELATED APPLICATIONS

This application is a Continuation of International Patent Application No. PCT/JP2017/038605, filed Oct. 26, 2017, which claims the benefit of Japanese Patent Application No. 2016-233500, filed Nov. 30, 2016 and Japanese Patent Application No. 2017-125592, filed Jun. 27, 2017, all of which are hereby incorporated by reference herein in their entirety.

BACKGROUND OF THE INVENTION

Field of the Invention

The present invention relates to an image processing apparatus and method that generate a virtual viewpoint image by using captured images from a plurality of cameras.

Background Art

Recently, a technique of performing synchronized image capturing at a plurality of viewpoints by installing a plurality of cameras at different positions and generating virtual viewpoint content by using a plurality of viewpoint images obtained from the image capturing has gained attention. Such a technique of generating virtual viewpoint content from a plurality of viewpoint images allows, for example, a scene capturing the highlight of a soccer game or a basketball game to be viewed from various angles. Thus, a user can enjoy a realistic feel compared to a normal image. Virtual viewpoint content based on a plurality of viewpoint images is generated by causing an image processing unit such as a server to collect images captured by the plurality of cameras and perform processing such as three-dimensional shape model generation, rendering, and the like. The generated virtual viewpoint content is transmitted to a user terminal and is viewed by the user.

A plurality of methods can be used as a virtual viewpoint content generation method in an image processing unit. There are, for example, model-based rendering in which rendering is performed upon generating a three-dimensional model, image-based rendering in which images captured by cameras are arranged in a three-dimensional space without generating a three-dimensional model, and the like. Each image generation method has its own image quality and processing load characteristics. PTL 1 discloses that to display a moving image based on three-dimensional shape data, rendering is performed by selecting, from a plurality of rendering methods, a rendering method capable of performing processing within one frame based on the resource amount, the three-dimensional shape data amount, and the frame rate.

CITATION LIST

Patent Literature

PTL 1: Japanese Patent Laid-Open No. 2004-086508

SUMMARY OF THE INVENTION

Technical Problem

The image quality of virtual viewpoint images generated by using the same image generation method changes in accordance with the arrangement positions of the plurality of cameras and the position of the virtual viewpoint. In other words, the image generation method that can generate a virtual viewpoint image with the highest image quality will change depending on the camera arrangement and the virtual viewpoint position. Although it is possible to select a rendering method that can perform processing within one frame in PTL 1, it does not ensure that the selected result is a high image quality method. Hence, it was impossible to stably generate a virtual viewpoint image with high image quality.

SUMMARY OF THE INVENTION

According to an embodiment of the present invention, an image generating apparatus and method that can generate a virtual viewpoint image with high image quality even when the position of a virtual viewpoint is changed is provided.

An image processing apparatus according to one aspect of the present invention includes the following arrangement. That is, there is provided an image processing apparatus that outputs a virtual viewpoint image based on a plurality of captured images obtained from different directions by a plurality of cameras, comprising: a viewpoint information obtainment unit configured to obtain viewpoint information indicating a position and a direction of a designated virtual viewpoint; a determination unit configured to determine, from a plurality of image processing methods based on the viewpoint information obtained by the viewpoint information obtainment unit, an image processing method to be used for generating a virtual viewpoint image corresponding to the virtual viewpoint based on the plurality of captured images; and an output unit configured to output the virtual viewpoint image generated by using the image processing method determined by the determination unit.

Further features of the present invention will become apparent from the following description of exemplary embodiments with reference to the attached drawings. Note that the same reference numerals denote the same or similar components in the accompanying drawings.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 5 is a view showing an example of tables in which conditions for determining the image generation method are described:

FIG. 7 is a view showing an example of a table in which conditions for determining the image generation method are described;

DESCRIPTION OF EMBODIMENTS

Figure 1:
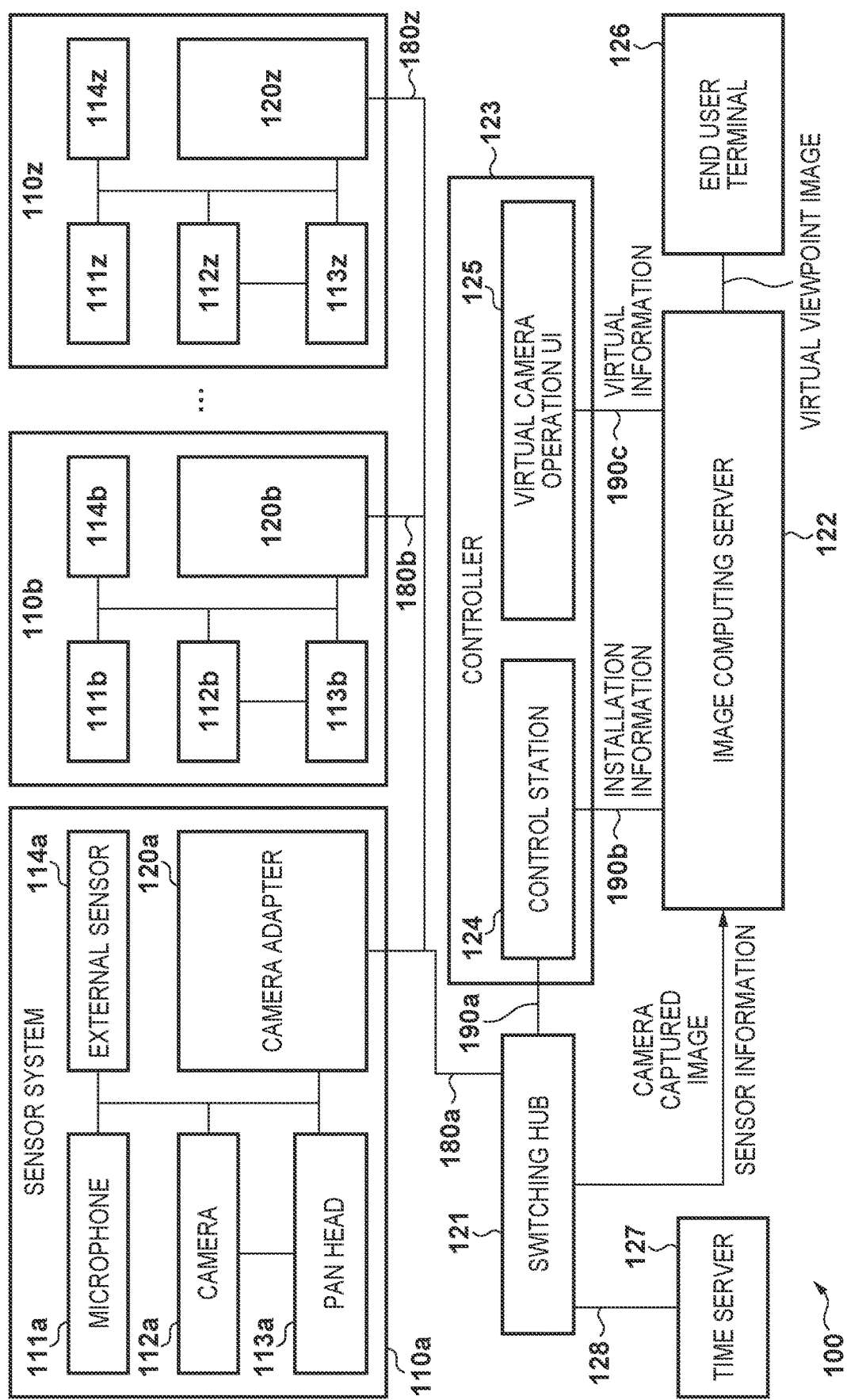
FIG. 1 is a block diagram for explaining an image processing system according to an embodiment.

Preferred embodiments of the present invention will be described in detail hereinafter with reference to the accompanying drawings.

First Embodiment

The first embodiment will be described hereinafter. In the first embodiment, a suitable image generation method is selected from a plurality of image generation methods based on the installation conditions of a plurality of cameras (group of cameras) and virtual viewpoint information of a virtual viewpoint image to be generated, and the virtual viewpoint image is generated by the selected image generation method. The installation conditions of the group of cameras include pieces of information such as the installation positions, the orientations, and the angles of view of the respective cameras. The virtual viewpoint information includes pieces of information such as the position, the orientation, the angle of view, and the direction of a virtual viewpoint.

Note that in this embodiment, the term "image" includes the concepts of both a moving image and a still image unless specifically stated otherwise. That is, an image processing system 100 according to this embodiment can process both a still image and a moving image. In addition, this embodiment will mainly describe an example in which virtual viewpoint content provided by the image processing system 100 includes a virtual viewpoint image and a virtual viewpoint sound. However, the present invention is not limited to this. For example, the sound need not be included in the virtual viewpoint content. Additionally, for example, the sound included in the virtual viewpoint content may be a sound collected by a microphone closest to the virtual viewpoint. In this embodiment, although a description concerning the sound will be partially omitted for the sake of descriptive simplicity, assume basically that an image and a sound are processed together.

<Outline of Image Processing System>

An image processing system according to the first embodiment will be described with reference to the system arrangement diagram shown in FIG. 1. The image processing system 100 generates virtual viewpoint content from an arbitrary virtual viewpoint by performing image capturing and sound collection by installing a plurality of cameras and microphones in a facility such as an arena (stadium) or a concert hall. The image processing system 100 includes sensor systems 110a to 110z, an image computing server 122, a controller 123, a switching hub 121, and an end user terminal 126.

The sensor system 110a includes a microphone 111a, a camera 112a, a pan head 113a, an external sensor 114a, and a camera adapter 120a. Note that the sensor system 110a is not limited this arrangement and suffices to include at least one camera adapter 120a, at least one camera 112a or one microphone 111a. For example, the sensor system 110a may be formed by one camera adapter 120a and a plurality of cameras 112a or may be formed by one camera 112a and a plurality of camera adapters 120a. The plurality of cameras and the plurality of camera adapters in the image processing system 100 are in an N-to-M (N and M are integers of 1 or more) correspondence. In addition, the sensor system 110a may include a device other than the microphone 111a, the camera 112a, the pan head 113a, and the camera adapter 120a. In this embodiment, the sensor systems 110a to 110z each include one corresponding camera of the cameras 112a to 112z. That is, the image processing system 100 includes a plurality of cameras for capturing an object from a plurality of directions.

In addition, although this embodiment has an arrangement in which the camera 112a and the camera adapter 120a are separated, they may be integrated using a single housing. In this case, the microphone 111a may be incorporated in the integrated camera 112a or may be connected to the outside of the camera 112a. The sensor systems 110b to 100z each have the same arrangement as the sensor system 110a. Note that the sensor systems 110a to 110z need not have the same arrangement.

In this embodiment, the 26 sets of systems from the sensor system 110a to the sensor system 110z will be denoted as the sensor systems 110 without discrimination unless specifically stated otherwise. In a similar manner, devices in each sensor system 110 will be expressed without discrimination as the microphone 111, the camera 112, the pan head 113, the external sensor 114, and the camera adapter 120 unless specifically stated otherwise. Note that the number of sensor systems is described as 26. However, the number of sensor systems is merely an example and is not limited to this.

In the image processing system 100, the sensor systems 110a to 110z are connected to the image computing server 122 via the switching hub 121. Also, the sensor systems 110a to 110z are connected to the switching hub 121 to form a star network in which data transmission/reception among the sensor systems 110 is performed via the switching hub 121. A sound collected by the microphone 111a and an image captured by the camera 112a are transmitted to the switching hub 121 via the camera adapter 120a.

The controller 123 includes a control station 124 and a virtual camera operation UI 125. The control station 124 manages, via networks 180a to 180z and 190a to 190c, the operation states and the parameter settings of the blocks forming the image processing system 100. Each network may be GbE (Gigabit Ethernet) or 10 GbE, which is Ethernet® complying with the IEEE standard, or may be formed by combining interconnect Infiniband, industrial Ethernet, and the like. The network is not limited to these and may be a network of another type.

The control station 124 transmits a three-dimensional model of a stadium or the like that is a virtual viewpoint image generation target to the image computing server 122. Furthermore, the control station 124 performs calibration at the time of the installation of each camera. More specifically, a marker is set in an image capturing target field, and the angle of view, the focal length, and the position and orientation of each camera 112 in the world coordinate system are calculated from a captured image obtained by the camera 112. The information of the position, the orientation, the angle of view, and the focal length calculated for each camera is transmitted, to the image computing server 122, as camera information related to the installation of the camera. The three-dimensional model and the information of each camera transmitted as described above are used when the image computing server 122 is to generate a virtual viewpoint image.

The virtual camera operation UI 125 transmits the virtual viewpoint information related to a virtual viewpoint of an image to be generated to the image computing server 122. The virtual viewpoint information includes, for example, the position, the orientation, the angle of view, and the focal length of a virtual viewpoint. Based on the data obtained from the sensor system 110, the image computing server 122 as an image generation apparatus generates a virtual viewpoint image obtained from a virtual viewpoint designated by the virtual camera operation UI 125. The generated virtual viewpoint image is transmitted from the image computing server 122 to the end user terminal 126.

A time server 127 distributes a time and a synchronization signal to the sensor systems 110a to 110z via the switching hub 121. The camera adapters 120a to 120z that received the time and the synchronization signal perform image frame synchronization by genlocking the cameras 112a to 112z, respectively, based on the time and the synchronization signal. That is, the time server 127 synchronizes the image capturing timings of the plurality of cameras 112. Since this will allow the image processing system 100 to generate a virtual viewpoint image based on the plurality of images captured at the same timing, it becomes possible to suppress the quality degradation of the virtual viewpoint image due to a shift in image capturing timings. Note that although the time server 127 manages the time synchronization of the plurality of cameras 112 in this embodiment, the present invention is not limited to this. For example, the cameras 112 or camera adapters 120 may independently perform processing for time synchronization.

The virtual viewpoint image generated by the image computing server 122 is transmitted to the end user terminal 126. A user operating the end user terminal 126 can view the image and hear the sound corresponding to the virtual viewpoint designated from the virtual camera operation UI 125. Note that although this embodiment will mainly describe an example of a case in which sound data (audio data) is included in the virtual viewpoint content, the sound data need not always be included. The image computing server 122 may compression-code the virtual viewpoint image by a standard technique represented by H.264 or HEVC and then transmit the virtual viewpoint image to the end user terminal 126 using the MPEG-DASH protocol. The virtual viewpoint image may also be transmitted to the end user terminal 126 in a non-compressed state. In particular, the end user terminal 126 is assumed to be a smartphone or a tablet in the former case in which compression coding is performed. The end user terminal is assumed to be a display capable of displaying a non-compressed image in the latter case. That is, the image computing server 122 can switch the image format of the virtual viewpoint image to be output in accordance with the type of the end user terminal 126. In addition, the image transmission protocol is not limited to MPEG-DASH, and for example, HLS (HTTP Live Streaming) or another transmission method may be used.

The components related to this embodiment will be described in detail next with reference to FIG. 2. FIG. 2 is a block diagram showing the functional blocks of the image computing server 122 described in FIG. 1.

An image input unit 201 receives each image and sound transmitted from the sensor systems 110 via the switching hub 121. Data received by the image input unit 201 is accumulated in a storage 204 by a data accumulation control unit 203. An installation information input unit 202 obtains, from the control station 124, the three-dimensional shape data of the stadium and the information related to the installation of the group of cameras for capturing the images to be used to generate the virtual viewpoint image. The information received by the installation information input unit 202 is stored in the storage 204 via the data accumulation control unit 203.

The data accumulation control unit 203 controls the data write to the storage 204 and the data read from the storage 204. A database management system (to be referred to as a DBMS hereinafter) that provides a database function can be raised as a specific example of the data accumulation control unit 203. The storage 204 is a data storage medium for accumulating data. A hard disk drive (HDD) and a solid state drive (SSD) can be raised as examples of the storage 204.

An image generation unit 205 generates a virtual viewpoint image based on the camera data input via the image input unit 201. The virtual viewpoint image generated by the image generation unit 205 is transmitted to an image output unit 206 and is output to the end user terminal 126 via the image output unit 206. The virtual viewpoint image generated by the image generation unit 205 is output as an image to the end user terminal 126 of FIG. 1 by the image output unit 206. The image output unit 206 performs image format conversion processing corresponding to the end user terminal 126.

A camera information obtainment unit 207 reads out the information related to the installation of the group of cameras stored in the storage 204 and transmits the information to a generation method determination unit 208. A viewpoint information obtainment unit 209 obtains the virtual viewpoint information from the virtual camera operation UI 125 and transmits the obtained virtual viewpoint information to the generation method determination unit 208 and the image generation unit 205. The generation method determination unit 208 determines the image generation method to be used at virtual viewpoint image generation based on the information related to the installation of the group of cameras transmitted from the camera information obtainment unit 207 and the virtual viewpoint information transmitted from the viewpoint information obtainment unit 209.

Figure 16:
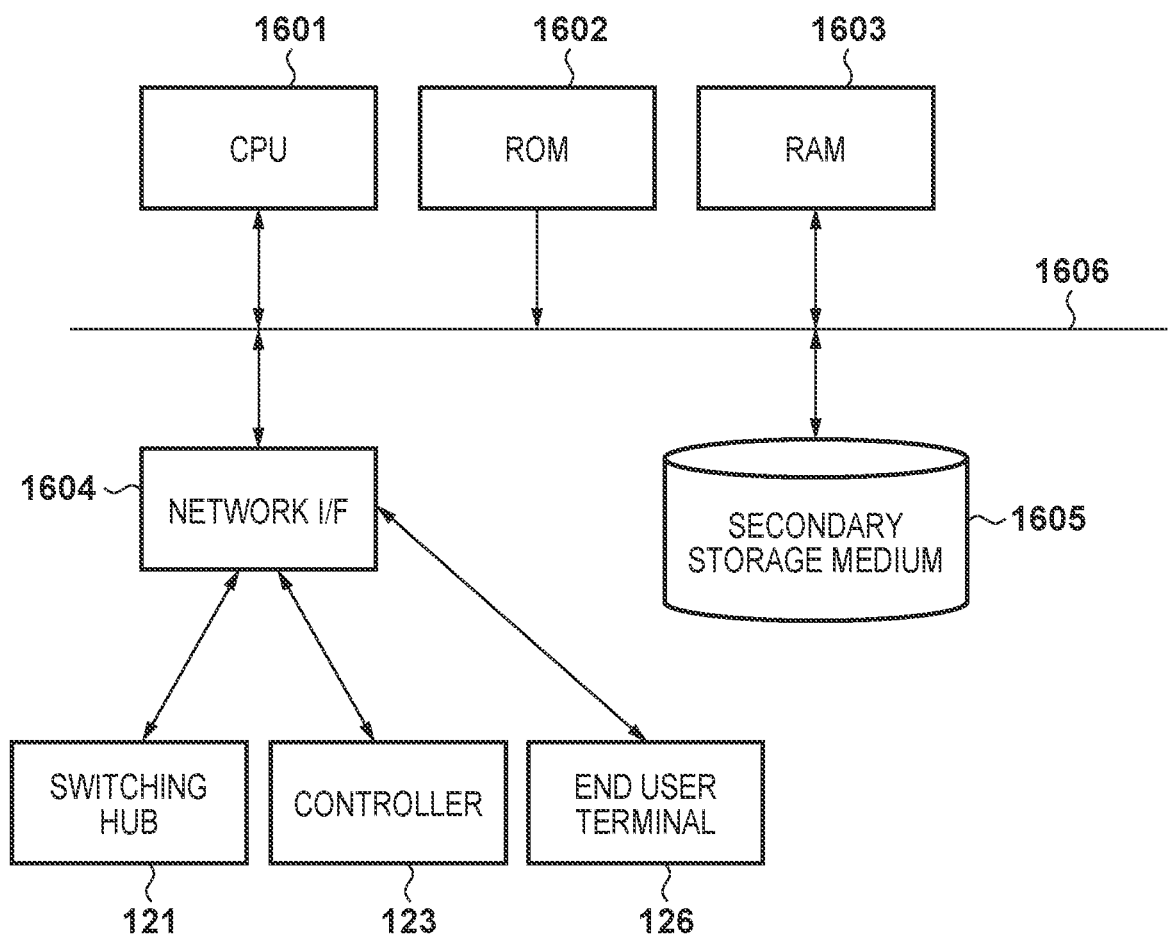
FIG. 16 is a block diagram showing an example of the hardware arrangement of an image computing server.

FIG. 16 is a block diagram showing an example of the hardware arrangement of the image computing server 122. In FIG. 16, a CPU 1601 implements various kinds of control by executing a program stored in a ROM 1602 or a program deployed to a RAM 1603. The ROM 1602 is nonvolatile read-only memory, and the RAM 1603 is a volatile readable and writable memory. A required program may be read out from secondary storage medium 1605, deployed to the RAM 1603, and executed by the CPU 1601. A network I/F 1604 is an interface that connects the image computing server 122 and the networks. More specifically, the network I/F connects the image computing server 122 to the switching hub 121, the controller 123, and the end user terminal 126 via the networks. The secondary storage medium 1605 provides the storage 204. A bus 1606 communicably connects the above-described components to each other. The image computing server 122 can implement each functional block described in FIG. 2 when the CPU 1601 executes a program stored in the ROM 1602 or the RAM 1603.

Figure 3:
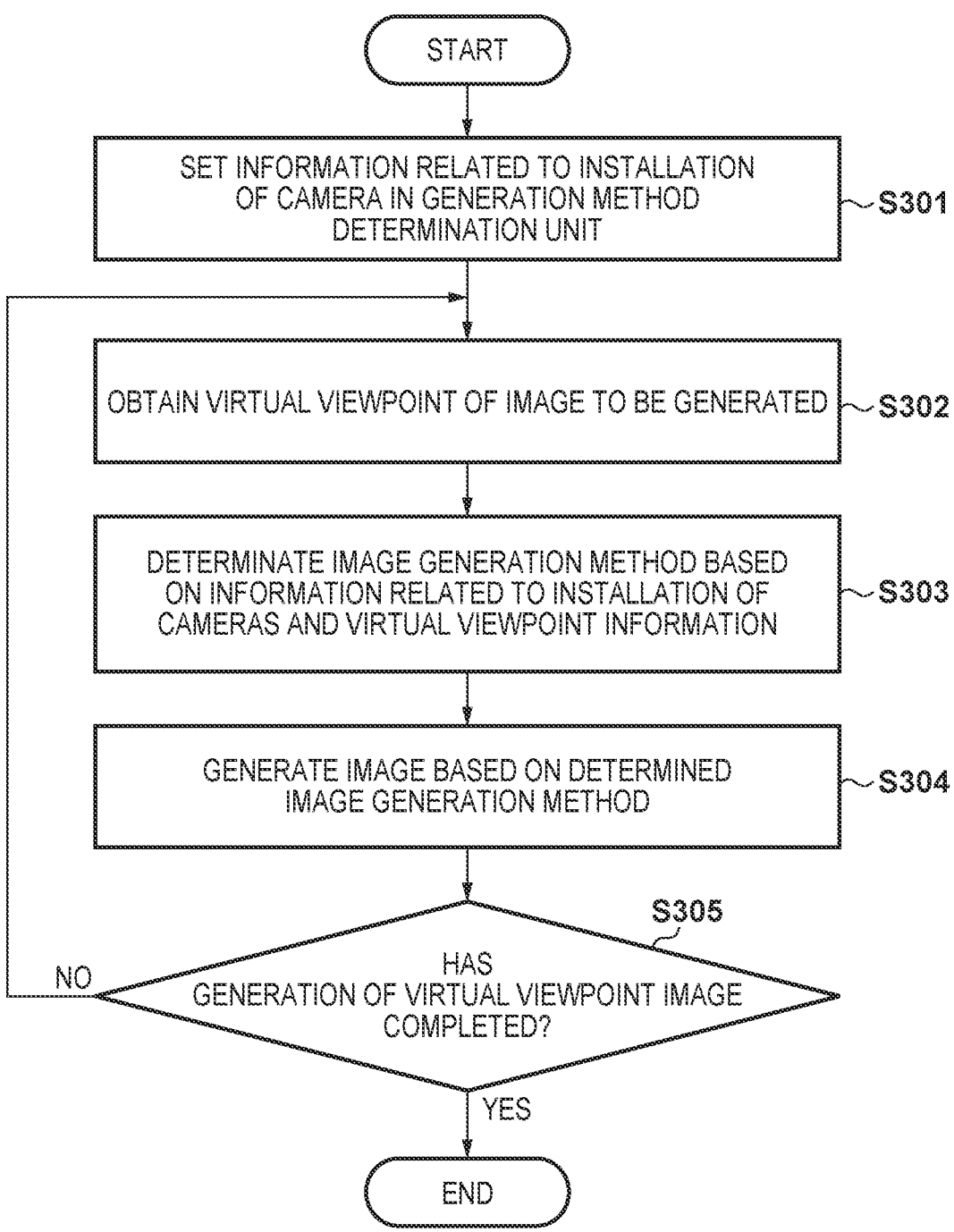
FIG. 3 is a flowchart for explaining virtual viewpoint image generation processing according to the first embodiment.

The virtual viewpoint image generation processing according to the first embodiment will be described next with reference to the flowchart of FIG. 3. In the first embodiment, a virtual viewpoint image will be generated by switching the image generation method in accordance with the information (more specifically, the position and the orientation) of a virtual viewpoint.

First, in step S301, the camera information obtainment unit 207 sets the information related to the installation of the cameras in the generation method determination unit 208. The processing of step S301 is processing to be performed in advance when a virtual viewpoint image is to be generated, and it is basically sufficient to perform this processing once after the cameras have been installed in the stadium or the like. Next, in step S302, the viewpoint information obtainment unit 209 obtains the virtual viewpoint information of the image to be generated. The virtual viewpoint information is information indicating the position and the orientation of the virtual viewpoint in this embodiment.

In step S303, the generation method determination unit 208 determines the image generation method to be used for virtual viewpoint image generation based on the information related to the installation of the group of cameras obtained in step S301 and the virtual viewpoint information obtained in step S302. The method for determining the image generation method will be described here with reference to FIGS. 4 and 5.

Figure 4:
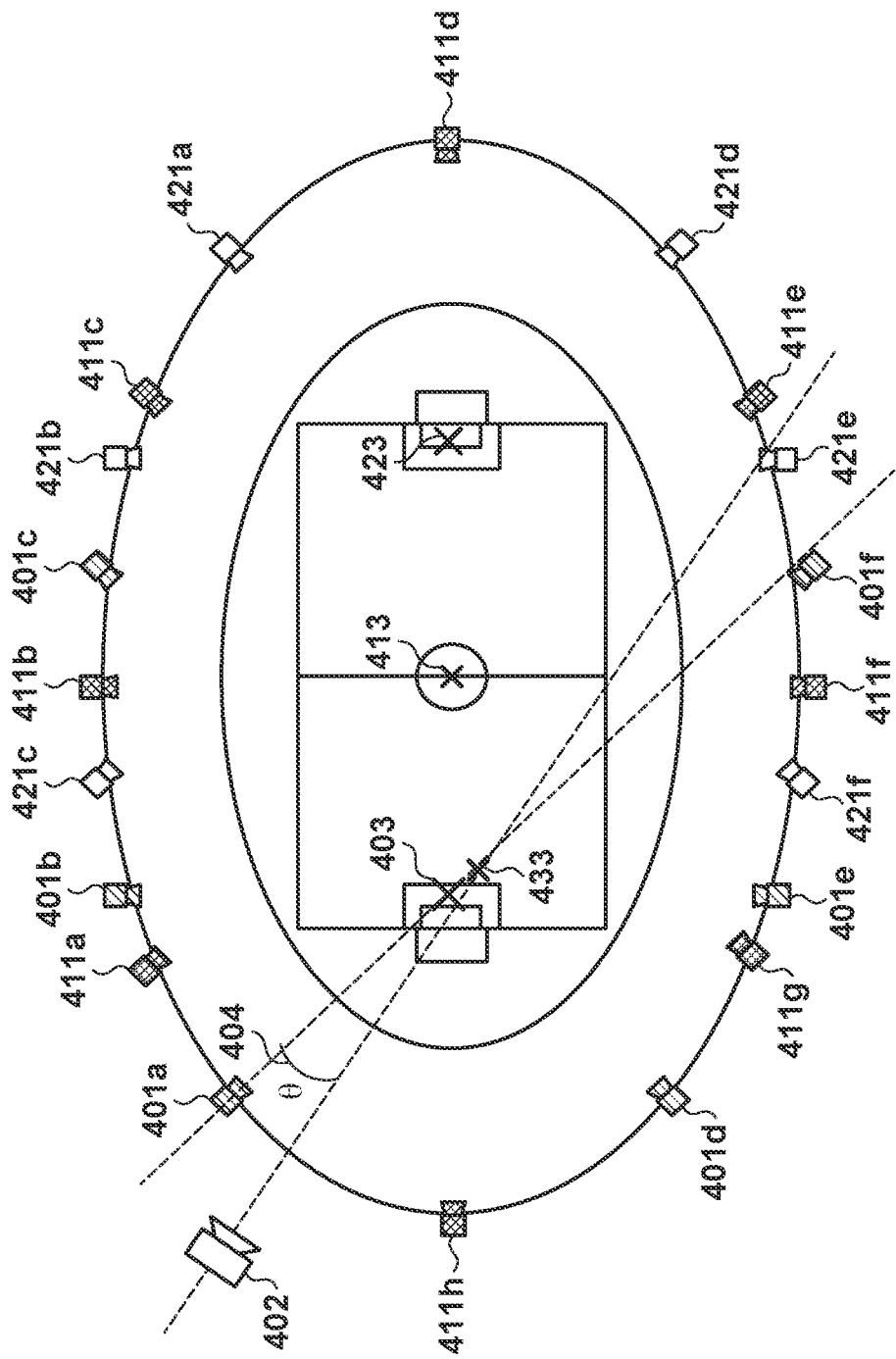
FIG. 4 is a view for explaining the determination of an image generation method according to the first embodiment.

FIG. 4 is a schematic view for explaining the processing to be performed by the generation method determination unit 208. FIG. 4 is a view showing a state in which a plurality of cameras have been installed in a stadium. Although the stadium and the positions of the cameras will be shown as a three-dimensional space in practice, a description will be given by simplifying the three-dimensional space into a two-dimensional surface as shown in FIG. 4 for the sake of descriptive convenience.

Reference symbols 401a to 401f, 411a to 411h, and 421a to 421f of FIG. 4 indicate cameras installed in the stadium. These cameras correspond to the sensor systems 110. When a plurality of cameras are to be installed in a stadium or the like, the cameras are divided into groups, and each group will be arranged to capture images of the same location. In FIG. 4, it is shown that the cameras 401a to 401f form one group (group of cameras) and that the orientation of each camera belonging to this group has been adjusted so as to face a common gaze point 403. In the same manner, the cameras 411a to 411h form one group and their respective orientations have been adjusted so that these cameras will face a gaze point 413. In addition, the cameras 421a to 421f form one group and their respective orientations have been adjusted so that these cameras will face a gaze point 423.

A reference numeral 402 denotes a virtual camera and indicates a virtual viewpoint. The virtual viewpoint image is generated based on the virtual viewpoint indicated by the virtual camera 402. Since the gaze point 403 is the gaze point closest to a gaze point 433 of the virtual camera 402, captured images obtained from the group of cameras (the cameras 401a to 401f) related to the gaze point 403 will be used to generate the virtual viewpoint image. A reference numeral 404 of FIG. 4 denotes an angle (θ) which is the difference between the orientations (to be referred to as the line-of-sight directions) of the virtual camera 402 and one camera 401. The processing to determine an image generation method by using this angle θ as a determination condition will be described hereinafter.

As described above, model-based rendering or image-based rendering may be employed as an image generation method. In model-based rendering, a three-dimensional model is formed from a camera image, and the generated model is made into an image and displayed. On the other hand, in image-based rendering, projective transformation is performed on an image captured by a camera to generate an image by approximating the position and the orientation of a virtual viewpoint. In the case shown in FIG. 4, the camera 401a is the camera closest to the virtual camera 402 among the group of cameras (the cameras 401a to 401f) related to the gaze point 403. The generation method determination unit 208 determines the image generation method to be used for virtual viewpoint image generation based on the size of the angle θ between the line-of-sight direction of the camera 401a and the line-of-sight direction of the virtual camera 402. As each line-of-sight direction is expressed three-dimensionally in this case, assume that the angle θ is an angle formed between the two directions when the line-of-sight directions are projected to a predetermined two-dimensional surface (for example, the surface of the field in the stadium). Since it is considered that the error of projective transformation will increase if the angle θ is equal to or larger than a predetermined value in this embodiment, the generation method determination unit 208 will determine to use model-based rendering. Since the error of projective transformation will become smaller when the angle θ is smaller than the predetermined value, the condition is suitable for performing image-based rendering. Hence, in a case in which the angle θ is smaller than the predetermined value, the generation method determination unit 208 will determine to use image-based rendering.

A table 5A of FIG. 5 shows a table for determining an image generation method by using the above-described angle θ of FIG. 4 as a condition parameter. The table 5A shows, as an example, a table that selects image-based rendering when the angle θ is equal to or less than 10° and selects model-based rendering when the angle θ is another angle. In step S303, the generation method determination unit 208 calculates the angle θ for each virtual viewpoint and determines the image generation method to be used for virtual viewpoint image generation by comparing the angle θ and the threshold.

In step S304, the image generation unit 205 uses the image generation method determined in step S303 to generate a virtual viewpoint image based on the captured images obtained from the group of cameras. In step S305, it is determined whether the virtual viewpoint image generation has been completed. If the virtual viewpoint image generation has not been completed, the processes from step S302 are repeated to continue the virtual viewpoint image generation. The completion of the virtual viewpoint image generation is instructed from, for example, the virtual camera operation UI 125.

As described above, according to the first embodiment, an image generation method that can generate a virtual viewpoint image with higher image quality is selected based on the information related to the installation of the cameras and the virtual viewpoint information. Therefore, stable generation of a virtual viewpoint image with high image quality is possible.

Second Embodiment

In the first embodiment, an image generation method to be used is selected based on the angles in the line-of-sight directions of the virtual camera and the actual camera. However, the selection condition of the image generation method is not limited to this. The second embodiment will describe an example in which the image generation method is determined by using the relationship between a virtual viewpoint and the neighboring region of a gaze point of a group of cameras. The system arrangement, the functional block, and the processing procedure according to the second embodiment are similar to those of the first embodiment (FIGS. 1, 2, and 3). The hardware arrangement of an image computing server 122 is as that described in FIG. 16.

Figure 6:
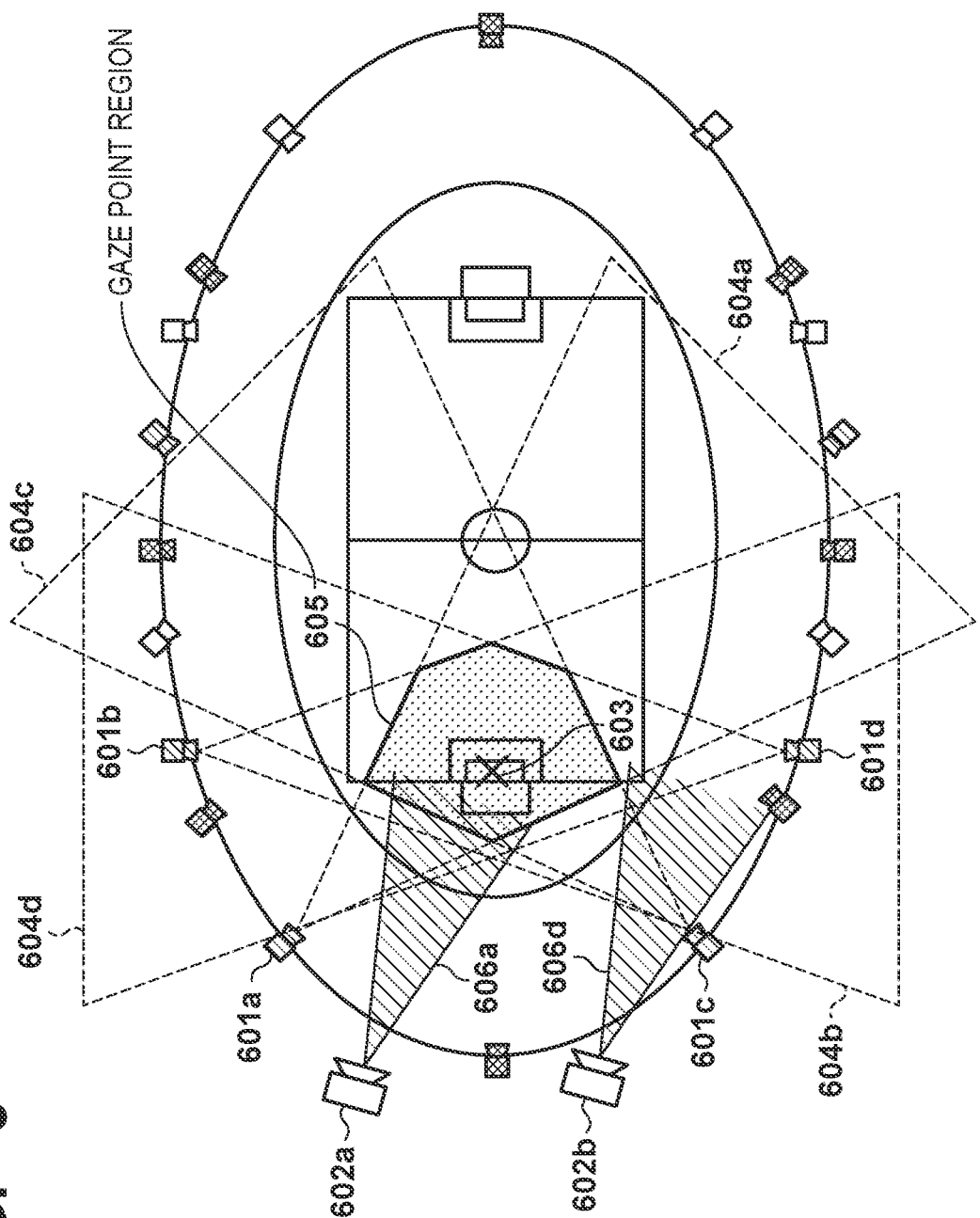
FIG. 6 is a view for explaining the determination of an image generation method according to the second embodiment.

FIG. 6 is a schematic view showing the positions of a virtual viewpoint and cameras arranged in a stadium. Reference numerals 601a to 601d of FIG. 6 denote cameras installed in the stadium. The cameras 601a to 601d correspond to sensor systems 110. The cameras 601a to 601d form one group (group of cameras) and have been adjusted to face a gaze point 603. Reference numerals 602a and 602b of FIG. 6 denote virtual cameras each indicating a virtual viewpoint. The two virtual cameras 602a and 602b that have different virtual viewpoints from each other are shown in FIG. 6.

Reference numerals 604a to 604d denote view volumes which are the image capturing ranges of the respective cameras 601a to 601d. A reference numeral 605 of FIG. 6 denotes a region where all of the view volumes 604a to 604d of the cameras 601a to 601d overlap. This kind of a region will be referred to as a gaze point region in this embodiment. The gaze point region 605 is a region that will be captured by all of the cameras 601a to 601d belonging to the group. Since an object present in the gaze point region 605 will be in a state in which it is captured by many cameras, it becomes possible to create a three-dimensional model of this object with higher precision than in another region. Thus, a generation method determination unit 208 will determine an image generation method to be used based on the ratio of the gaze point region 605 included in a virtual viewpoint image, that is, the ratio occupied by the gaze point region 605 in the field of view of a virtual viewpoint.

A large region of the gaze point region 605 is included in the view volume of the virtual camera 602a shown in FIG. 6. Hence, it is suitable to select model-based rendering when a virtual viewpoint image of the virtual camera 602a is to be generated. On the other hand, since the gaze point region 605 is not included in the view volume in the case of virtual camera 602b, image-based rendering is suitable for virtual viewpoint image generation because the improvement of image quality by model-based rendering cannot be expected. Hence, determination will be made so that model-based rendering will be used when the ratio of the gaze point region included in the virtual viewpoint image is larger than a predetermined value and so that image-based rendering will be used when the ratio of the gaze point region is equal to or smaller than the predetermined value. By switching the image generation method based on the ratio of the gaze point region included in a virtual viewpoint image to be generated in this manner, it is possible to select an image generation method that can generate a virtual viewpoint image with high image quality.

FIG. 7 shows a table for determining the image generation method by using, as a condition parameter, the ratio of the gaze point region 605 included in the view volume of a virtual camera. FIG. 7 shows, as an example, a table that selects model-based rendering for image generation in a case in which the coverage ratio of the gaze point region 605 in the image is equal to or more than 80% and selects image-based rendering for other cases. In step S303 of FIG. 3 described in the first embodiment, the coverage ratio of the gaze point region 605 is obtained from the positions and orientations of the virtual viewpoint and the gaze point region 605 which are obtained in advance in FIG. 6, and the image generation method will be determined in accordance with the obtained coverage ratio.

As described above, according to the second embodiment, an image generation method that can generate a virtual viewpoint image with higher image quality can be selected based on the information related to the installation of the cameras and the virtual viewpoint information in a similar manner as the first embodiment. Therefore, stable generation of a virtual viewpoint image with high image quality is possible.

Third Embodiment

Figure 8:
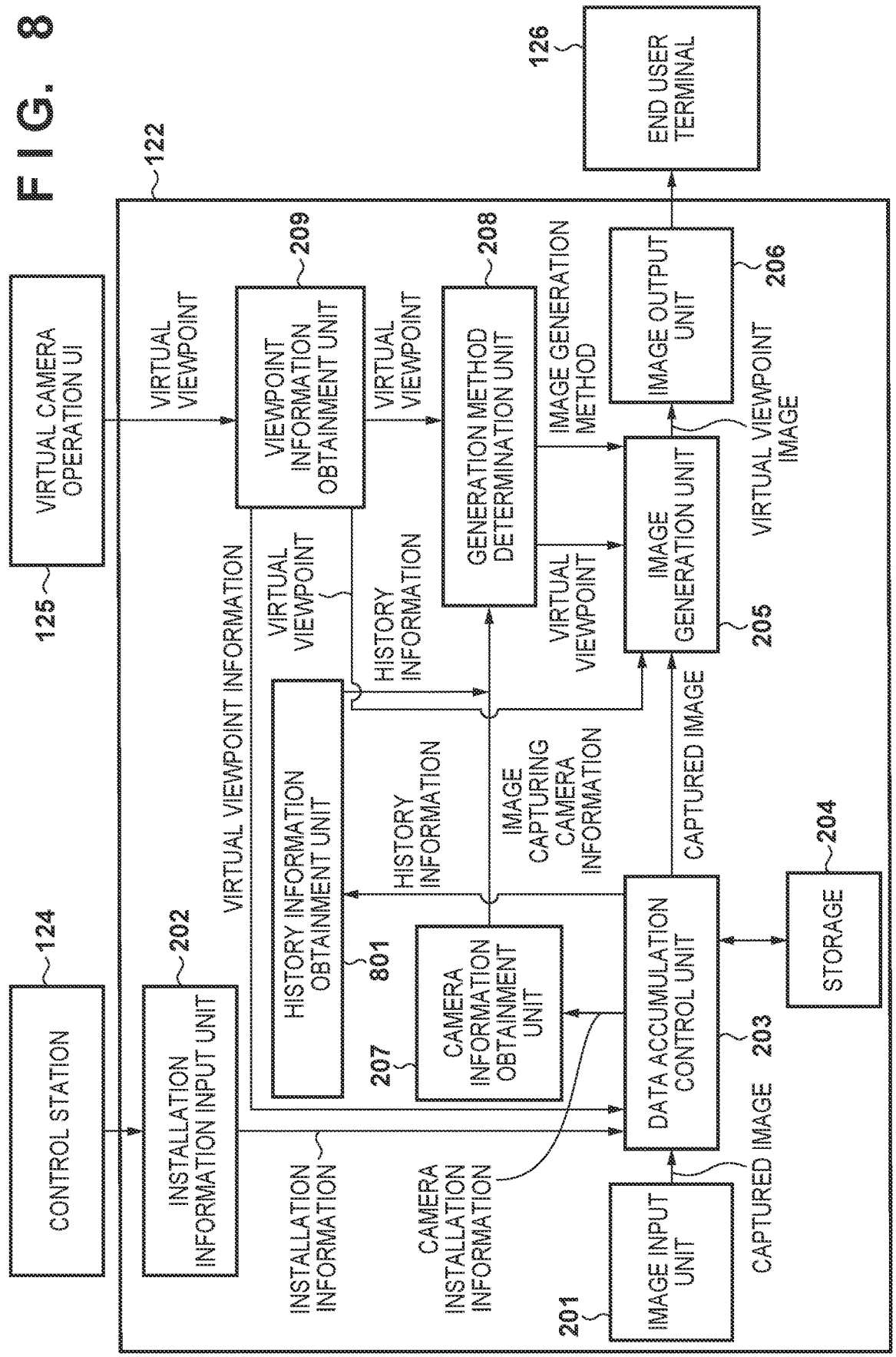
FIG. 8 is a block diagram for explaining functional blocks according to the third embodiment.

In the third embodiment, an image generation method will be determined by using the history information of a virtual viewpoint designated via a virtual camera operation UI 125. The arrangement of an image processing system 100 according to the third embodiment is similar to that of the first embodiment (FIG. 1). FIG. 8 shows a functional block diagram of an image computing server 122 according to the third embodiment. In the functional blocks shown in FIG. 8, the same reference numerals denote similar functional blocks as those in the first embodiment (FIG. 2). In addition, the hardware arrangement of the image computing server 122 is the same as or similar to that described in FIG. 16.

In FIG. 8, in addition to accumulating captured images in a storage 204, a data accumulation control unit 203 will associate a piece of virtual viewpoint information obtained by a viewpoint information obtainment unit 209 with time and accumulate the associated information as history information. A history information obtainment unit 801 reads out the history information indicating a change in the time-axis direction of the virtual viewpoint information from the storage 204 and transmits the history information to a generation method determination unit 208.

Figure 9:
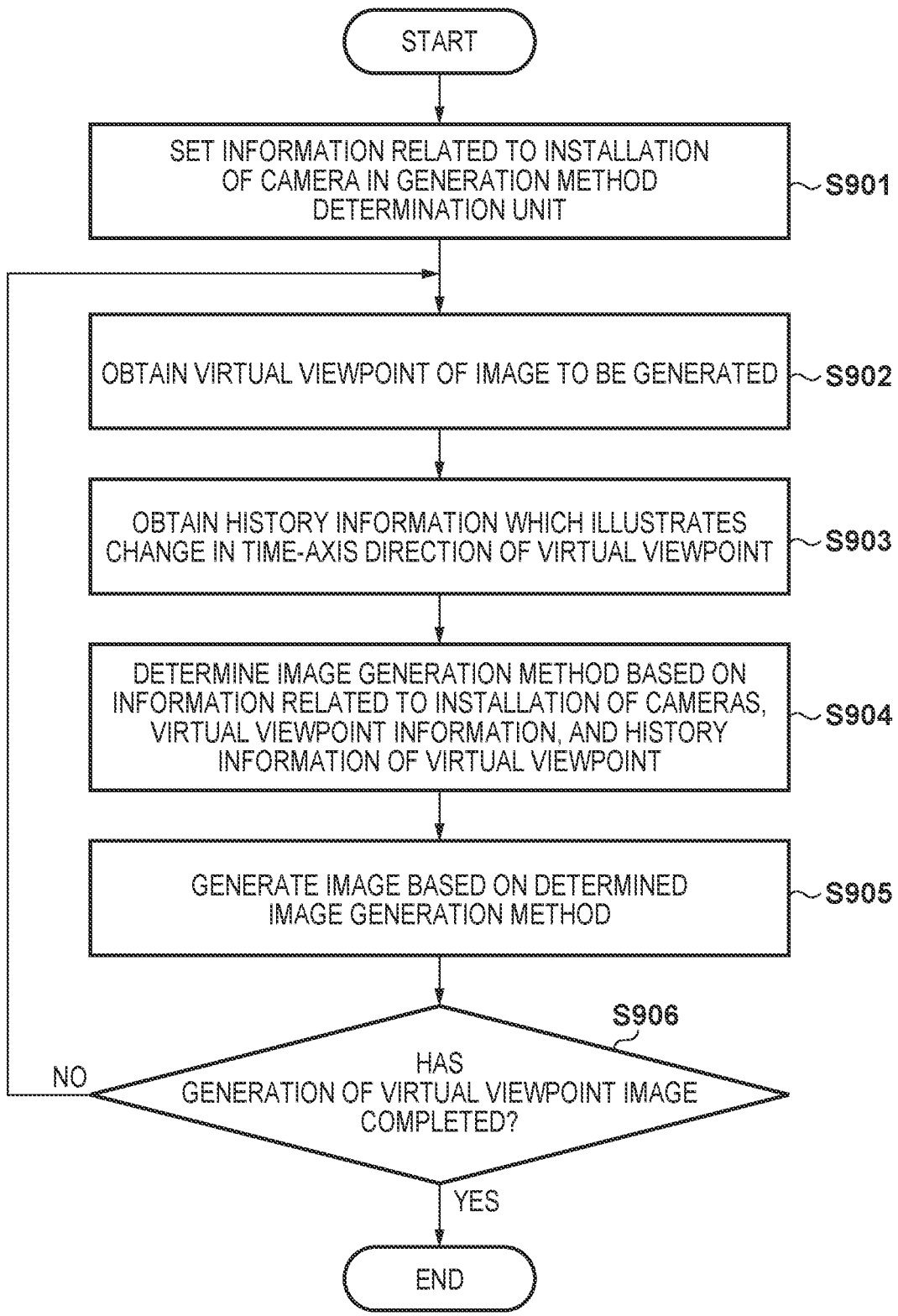
FIG. 9 is a flowchart for explaining a virtual viewpoint image generation processing according to the third embodiment.

Virtual viewpoint image generation processing according to the third embodiment will be described with reference to the flowchart of FIG. 9. FIG. 9 is a flowchart for explaining the virtual viewpoint image generation processing according to the third embodiment. Note that the processes of steps S901 and S902 in FIG. 9 are similar processes as those of steps S301 and S302 according to the first embodiment.

In step S903, the history information obtainment unit 801 obtains the history information of a virtual viewpoint. In step S904, the generation method determination unit 208 determines the image generation method for generating a virtual viewpoint image. The image generation method is determined based on the information related to the installation of the cameras obtained in step S901, the virtual viewpoint information obtained in step S902, and the history information of the virtual viewpoint obtained in step S903. The process performed in step S904 will be described below.

The movement of a virtual viewpoint may pass any location in the three-dimensional space. In this case, a subsequent viewpoint position can be estimated to a certain degree by using the history showing the movements (changes) of the virtual viewpoint up to that point. For example, the generation method determination unit 208 estimates the position and the orientation of the virtual viewpoint in a subsequent time based difference between the position and the orientation of the virtual viewpoint in the current time and the position and the orientation of the virtual viewpoint in a past time. If the estimated movement is a movement drawing an arc with respect to the object, there is a possibility that an image can be expressed with higher image quality by executing image generation upon generating a model. Hence, for example, the generation method determination unit 208 will select model-based rendering when the history information indicates that the virtual viewpoint has an arc-shaped movement even if the ratio of the gaze point region in the virtual viewpoint image has been determined to be small by executing, in combination, an image generation method determination method as in the second embodiment. For example, in a case in which the ratio of the gaze point region in the virtual viewpoint image falls within the range of 50% (inclusive) to 80% (inclusive) and the history information indicates that the virtual viewpoint has an arc-shaped movement, model-based rendering will be selected. In this manner, a more suitable image generation method for a scene can be selected by selecting an image generation method based on the estimated movement of the virtual viewpoint.

In step S905, an image generation unit 205 uses the image generation method determined in step S904 to generate a virtual viewpoint image based on the captured images obtained from the group of cameras. In step S906, it is determined whether the virtual viewpoint image generation has been completed. If the virtual viewpoint image generation has not been completed, the processes are repeated from step S902. The process of step S906 is similar to that of step S305.

As described above, according to the third embodiment, an image generation method suitable for virtual viewpoint image generation is selected based on the information related to the installation of the cameras, the virtual viewpoint information, and the history information of the virtual viewpoint. Hence, a virtual viewpoint image corresponding to the scene can be generated stably with high image quality. Note that although the embodiment described above showed an example in which an image generation method determination method according to the first embodiment or the second embodiment was used in combination, the determination method of the first embodiment or the second embodiment need not be used in combination. For example, the image generation method to be used may be determined based on only the history information.

Fourth Embodiment

Figure 10:
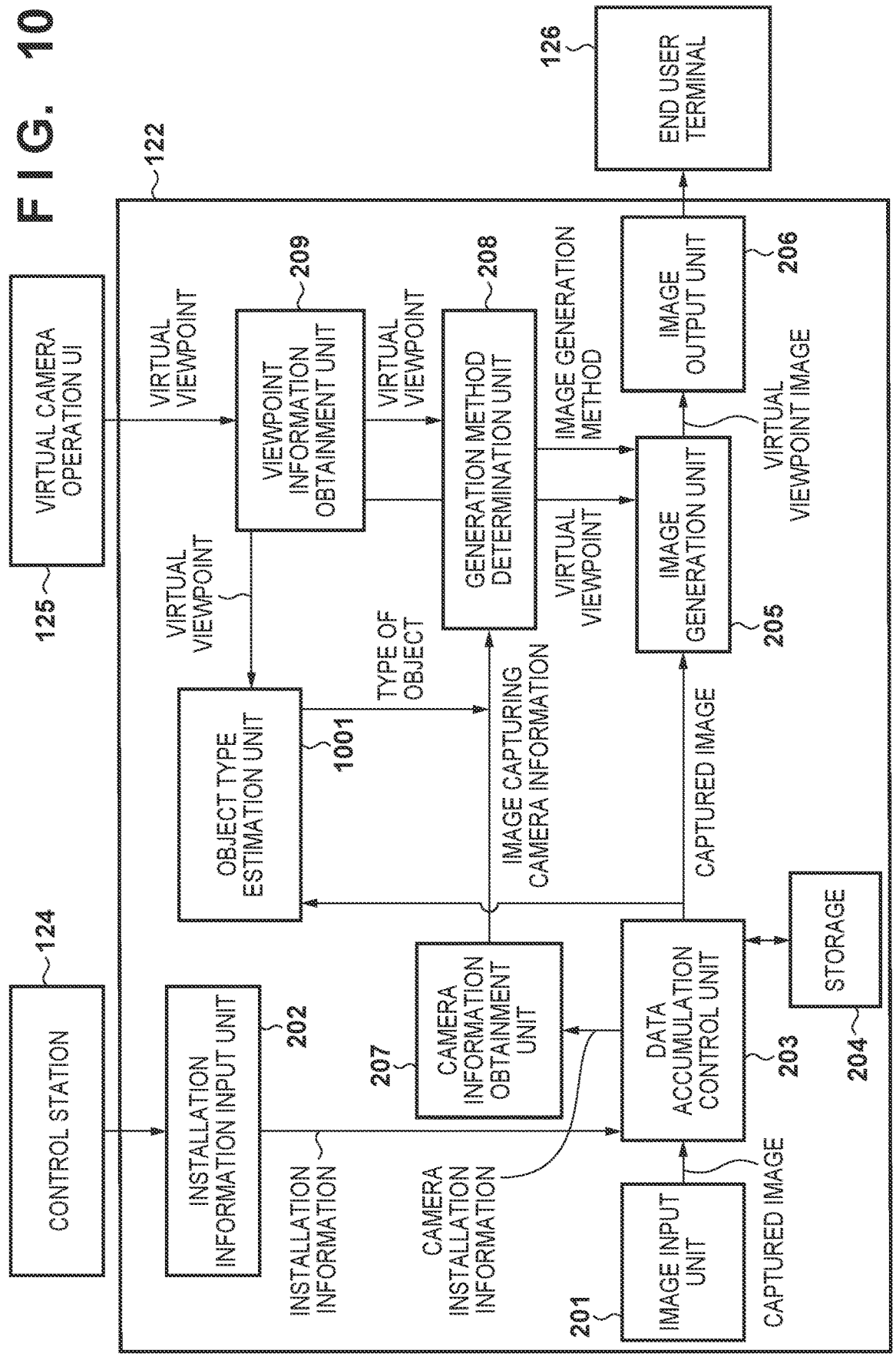
FIG. 10 is a block diagram for explaining functional blocks according to the fourth embodiment.
Figure 11:
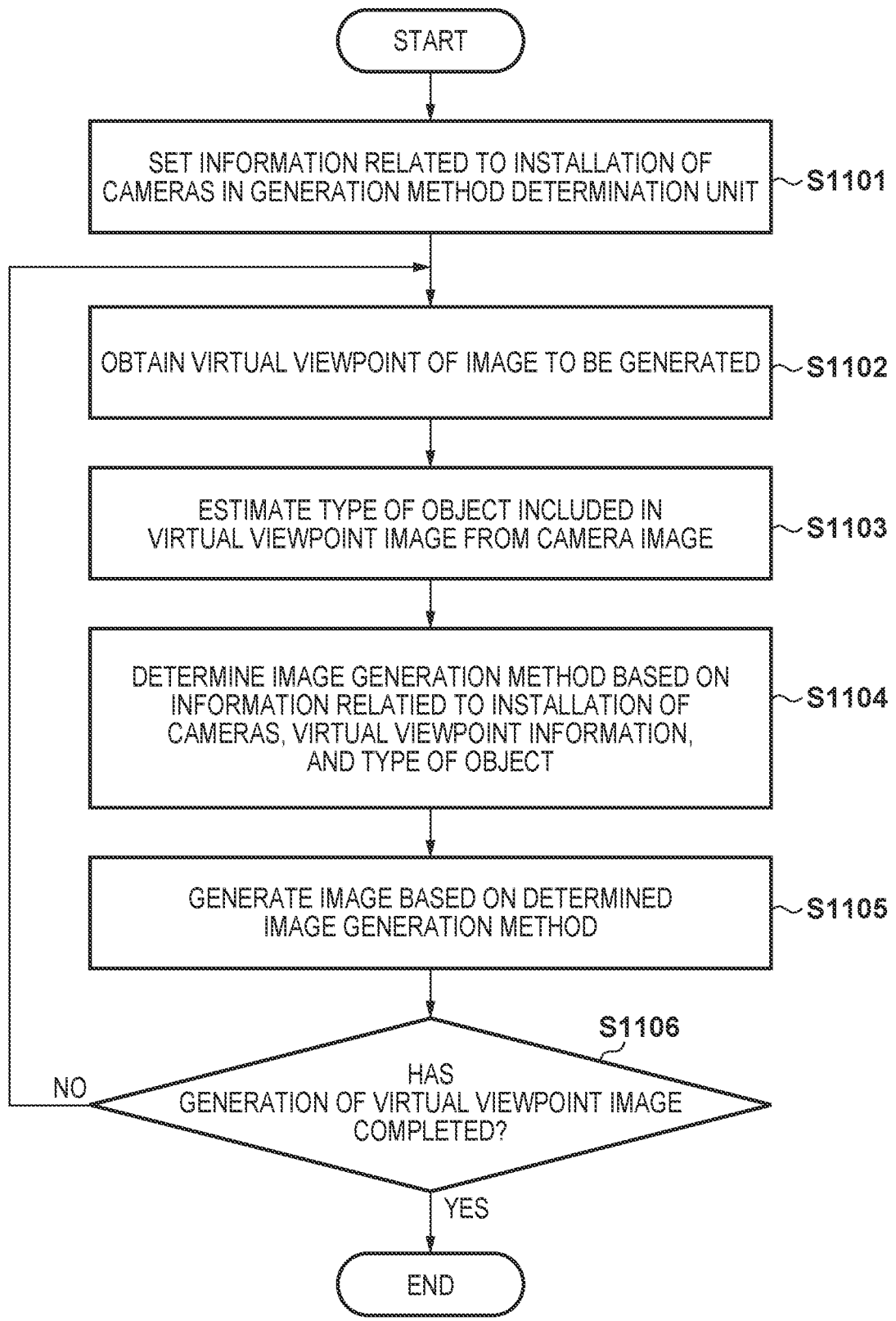
FIG. 11 is a flowchart for explaining a virtual viewpoint image generation processing according to the fourth embodiment.

In the fourth embodiment, the type of an object included in a virtual viewpoint image corresponding to a virtual viewpoint designated via a virtual camera operation UI 125 is estimated, and an image generation method is determined based on the estimated object type. In this case, the type of an object is the type of a person or a structure or whether the object is a complex object with a concave-convex pattern. The arrangement of an image processing system 100 according to the fourth embodiment is similar to that of the first embodiment (FIG. 1). FIG. 10 shows the functional block diagram of an image computing server 122 according to the fourth embodiment. In the functional blocks of FIG. 10, the same reference numerals denote the functional blocks which are similar to those of the first embodiment (FIG. 2). The hardware arrangement of the image computing server 122 is similar to that described in FIG. 16.

An object type estimation unit 1001 estimates an object in a virtual viewpoint image and the type of the object based on the virtual viewpoint information obtained by a viewpoint information obtainment unit 209. A captured image input for the generation of a virtual viewpoint image is used to estimate an object present in the virtual viewpoint image. For example, out of one group (group of cameras) corresponding to a gaze point closest to a position of interest of the virtual viewpoint, a determination will be performed on an object included in an image captured by a camera closest to the virtual viewpoint. In the case of the example shown in FIG. 4, the captured image obtained from a camera 401*a* will be used.

Virtual viewpoint image generation processing according to the fourth embodiment will be described with reference to the flowchart of FIG. 1. Note that the processes of steps S1101 and S1102 are similar to those of steps S301 and S302 of the first embodiment.

In step S1103, the object type estimation unit 1001 performs processing to estimate an object included in a virtual viewpoint image and the type of the object. The estimation of the object can be performed by, for example, a technique for executing pattern matching on a shape obtained in advance or the like. In step S1104, a generation method determination unit 208 determines the image generation method for generating a virtual viewpoint image. The image generation method is determined based on the information related to the installation of the cameras obtained in step S1101, the virtual viewpoint information obtained in step S1102, and the type of the object included in the virtual viewpoint image obtained in step S1103. The image generation method determination processing performed in step S1104 will be described hereinafter.

Various kinds of objects can be included in a virtual viewpoint image. For example, an object with a complex shape such as a person can be set as an object in a stadium, and a man-made object such as a piano can be set as an object in a concert. The image generation method suitable for generating a virtual viewpoint image varies depending on the object. For example, in the case of a person, model-based rendering is suitable for expressing concave-convex shapes, and in the case of a simple shape formed by a plurality of surfaces, image-based rendering can be selected to generate a more suitable image. In step S1104, the type of the object is used to perform processing to switch the image generation method. It is possible to use, for example, the relationship between the determination condition and the type of the object shown in a table 5B of FIG. 5. Compared to a table 5A, in the table 5B, options to select image-based rendering or model-based rendering in accordance with the determination result of the type of the object have been added to the case of 5°≤θ<10°.

In step S1105, an image generation unit 205 uses the image generation method determined in step S1104 to generate a virtual viewpoint image. In step S1106, it is determined whether the virtual viewpoint image generation has been completed. If the virtual viewpoint image generation has not been completed, the processes are repeated from step S1102 to continue the virtual viewpoint image generation. The processes of step S1105 and Si 106 are similar to those of steps S304 and step S305 in the first embodiment.

As described above, according to the fourth embodiment, a suitable image generation method is selected based on the information related to the installation of the cameras, the virtual viewpoint information, and the type of the object included in the virtual viewpoint. A virtual viewpoint image with high image quality can be generated suitably for each object by using the selected image generation method.

Fifth Embodiment

Figure 12:
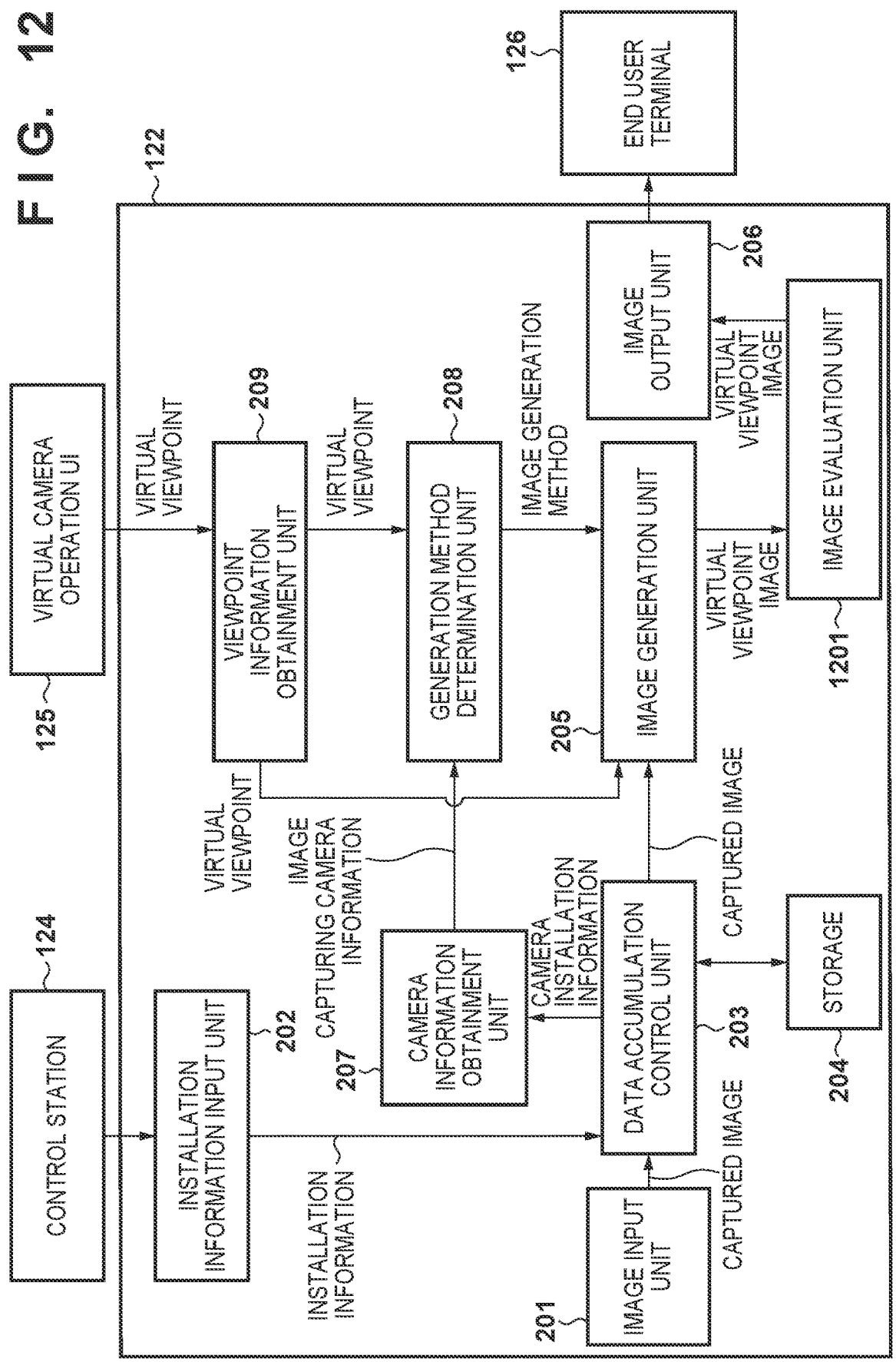
FIG. 12 is a block diagram for explaining functional blocks according to the fifth embodiment.

In the fifth embodiment, a plurality of virtual viewpoint images are generated by using a plurality of image generation methods, and an image with the best image quality will be output by evaluating the generated virtual viewpoint images. The arrangement of an image processing system 100 according to the fifth embodiment is similar to that of the first embodiment (FIG. 1). FIG. 12 shows the functional blocks of an image computing server 122 according to the fifth embodiment. In the functional blocks of FIG. 12, the same reference numerals denote similar functional blocks as those of the functional blocks of the first embodiment (FIG. 2). The hardware arrangement of the image computing server 122 is similar to that described in FIG. 16.

In FIG. 12, an image evaluation unit 1201 evaluates the plurality of virtual viewpoint images generated by an image generation unit 205 and outputs the most suitable image based on the evaluation to an image output unit 206.

Figure 13:
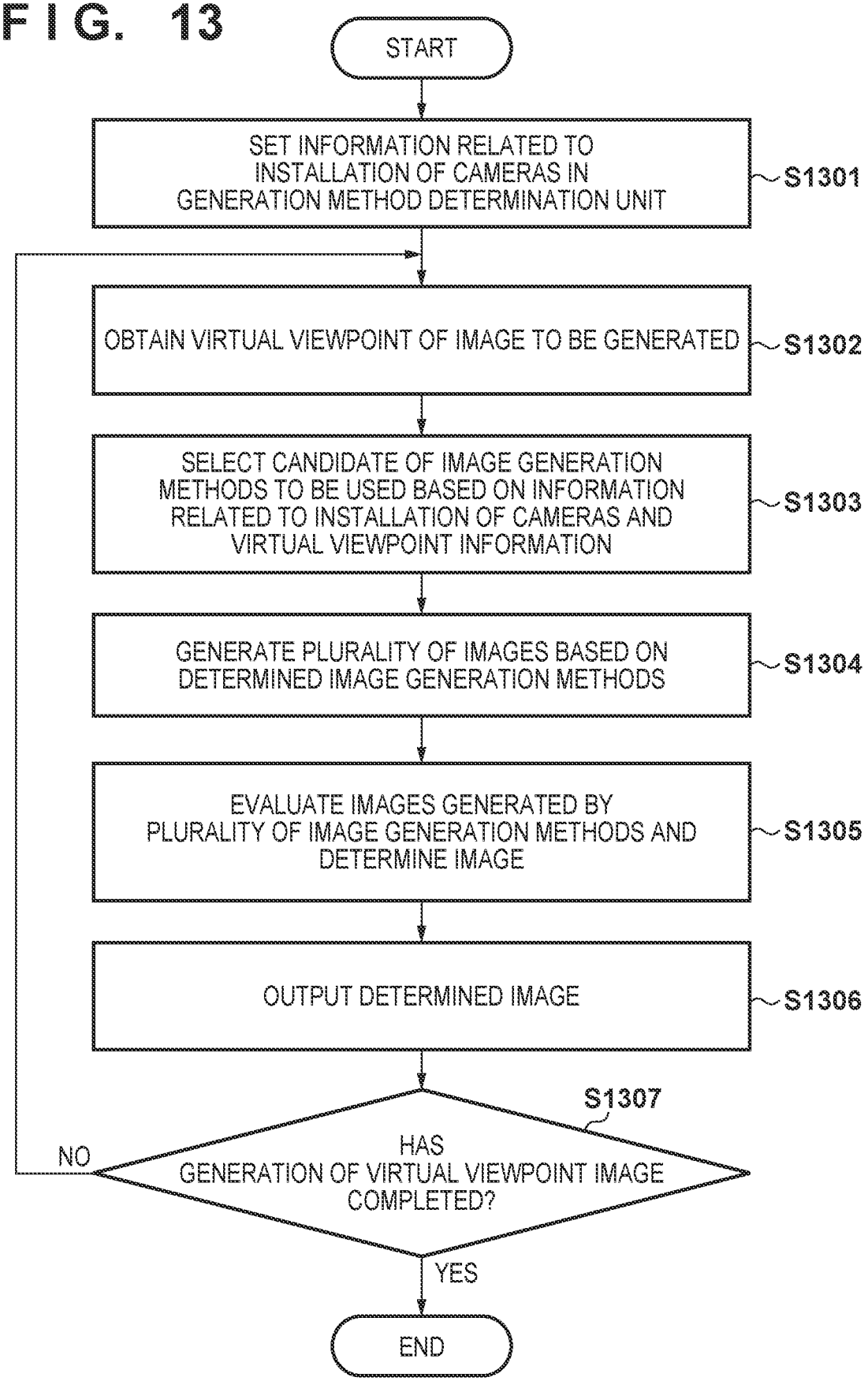
FIG. 13 is a flowchart for explaining a virtual viewpoint image generation processing according to the fifth embodiment.

Virtual viewpoint image generation processing according to the fifth embodiment will be described with reference to the flowchart of FIG. 13. Note that the processes of steps S1301 and S1302 are similar to those of steps S301 and S302 of the first embodiment (FIG. 3).

In step S1303, a generation method determination unit 208 determines a plurality of image generation methods for generating virtual viewpoint images based on the information related to the installation of the cameras obtained in step S1301 and the virtual viewpoint information. That is, for one virtual viewpoint, the generation method determination unit 208 selects, out of the various kinds of image generation methods, a plurality of candidates that are suitable as the image generation methods based on the information related to the installation of the cameras and the virtual viewpoint information for this case. In step S1304, the image generation unit 205 generates a plurality of virtual viewpoint images by using the plurality of image generation methods selected in step S1303.

In step S1305, the image evaluation unit 1201 evaluates the plurality of virtual viewpoint images generated in step S1304 and determines the image to be output. As the image evaluation method, for example, an image obtained from an actual camera positioned closest to the one virtual viewpoint, among one group (group of cameras) corresponding to a gaze point closest to a position of interest of the one virtual viewpoint described above, is set as a correct image. Subsequently, a method of evaluating each virtual viewpoint image based on a difference between the correct image and each of the plurality of virtual viewpoint images can be used. The image evaluation unit 1201 will determine, among the plurality of virtual viewpoint images that have been generated, the virtual viewpoint image with the smallest difference with the correct image as the image with the best image quality. In step S1306, the image evaluation unit 1201 outputs the virtual viewpoint image determined in step S1305 via the image output unit 206.

In step S1307, it is determined whether the virtual viewpoint image generation has been completed. If the virtual viewpoint image generation has not been completed, the processes from step S1102 are repeated to continue the virtual viewpoint image generation. The process of step S1307 is similar to that of step S305 of the first embodiment (FIG. 3).

As described above, according to the fifth embodiment, a plurality of virtual viewpoint images are generated by a plurality of kinds of image generation methods, and a virtual viewpoint image to be output is determined by evaluating the generated virtual viewpoint images. Therefore, it is possible to output a high-quality image more reliably.

Note that although the plurality of image generation methods to be used are determined based on the information related to the installation of the camera and the virtual viewpoint information in the fifth embodiment, the present invention is not limited to this. For example, in an arrangement in which image-based rendering and model-based rendering, which are two types of image generation methods, have been prepared, it may be set so that the image generation unit 205 will generate the virtual viewpoint images by these two types of image generation methods and transmit the generated images to the image evaluation unit 1201. The generation method determination unit 208 can be omitted in this case.

Sixth Embodiment

Figure 14:
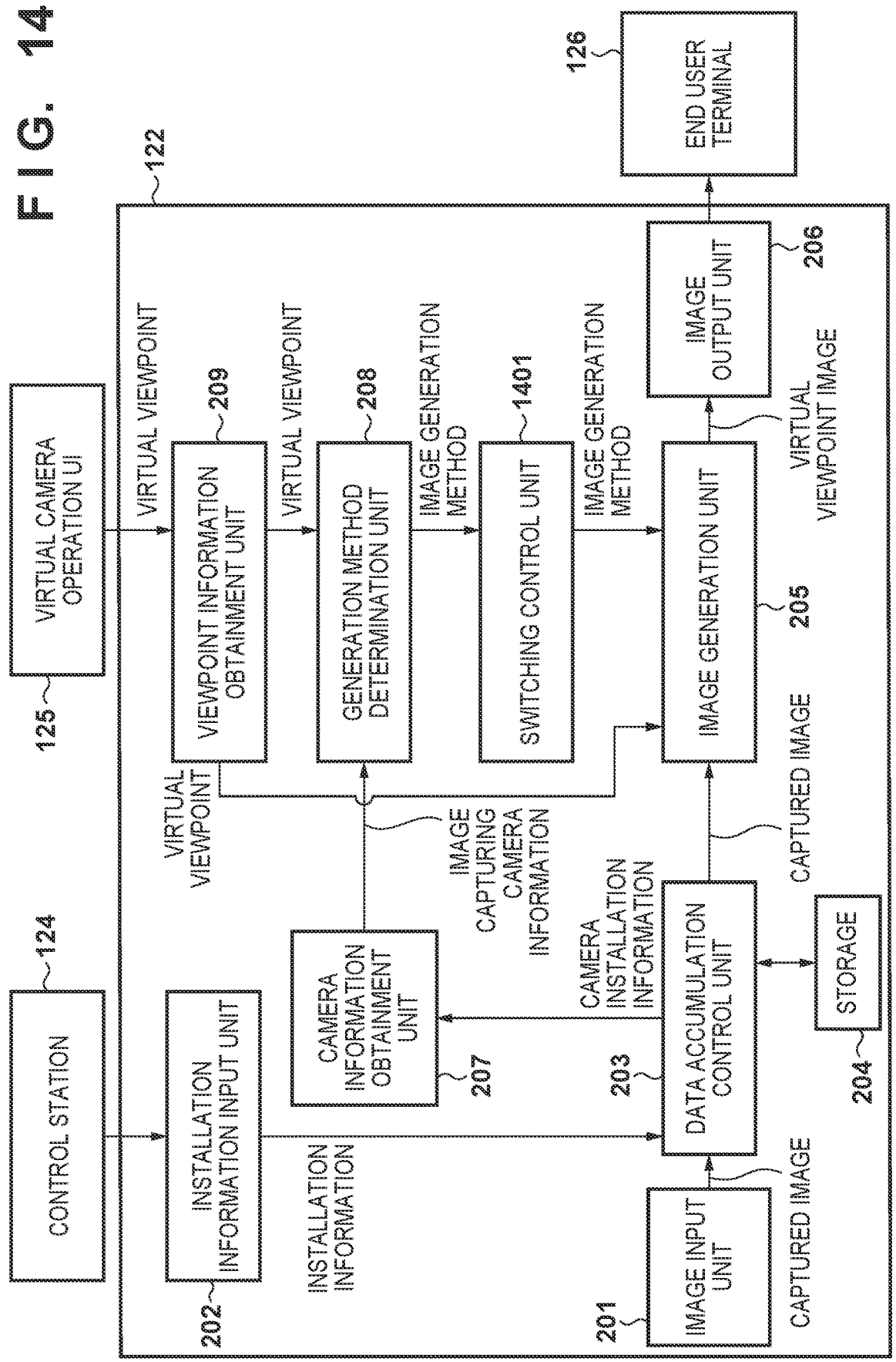
FIG. 14 is a block diagram for explaining functional blocks according to the sixth embodiment.

In the sixth embodiment, the image generation method is switched at a suitable timing by determining whether to switch the image generation method for virtual viewpoint image generation based on the time that has elapsed from the immediately preceding switching operation. FIG. 14 shows the functional blocks of an image computing server 122 according to the sixth embodiment. In the functional blocks of FIG. 14, the same reference numerals denote the functional blocks which are similar to those of the first embodiment (FIG. 2). The hardware arrangement of the image computing server 122 is also similar to that described in FIG. 16.

In FIG. 14, a switching control unit 1401 determines the timing to actually apply the virtual viewpoint image generation method determined by a generation method determination unit 208.

Figure 15:
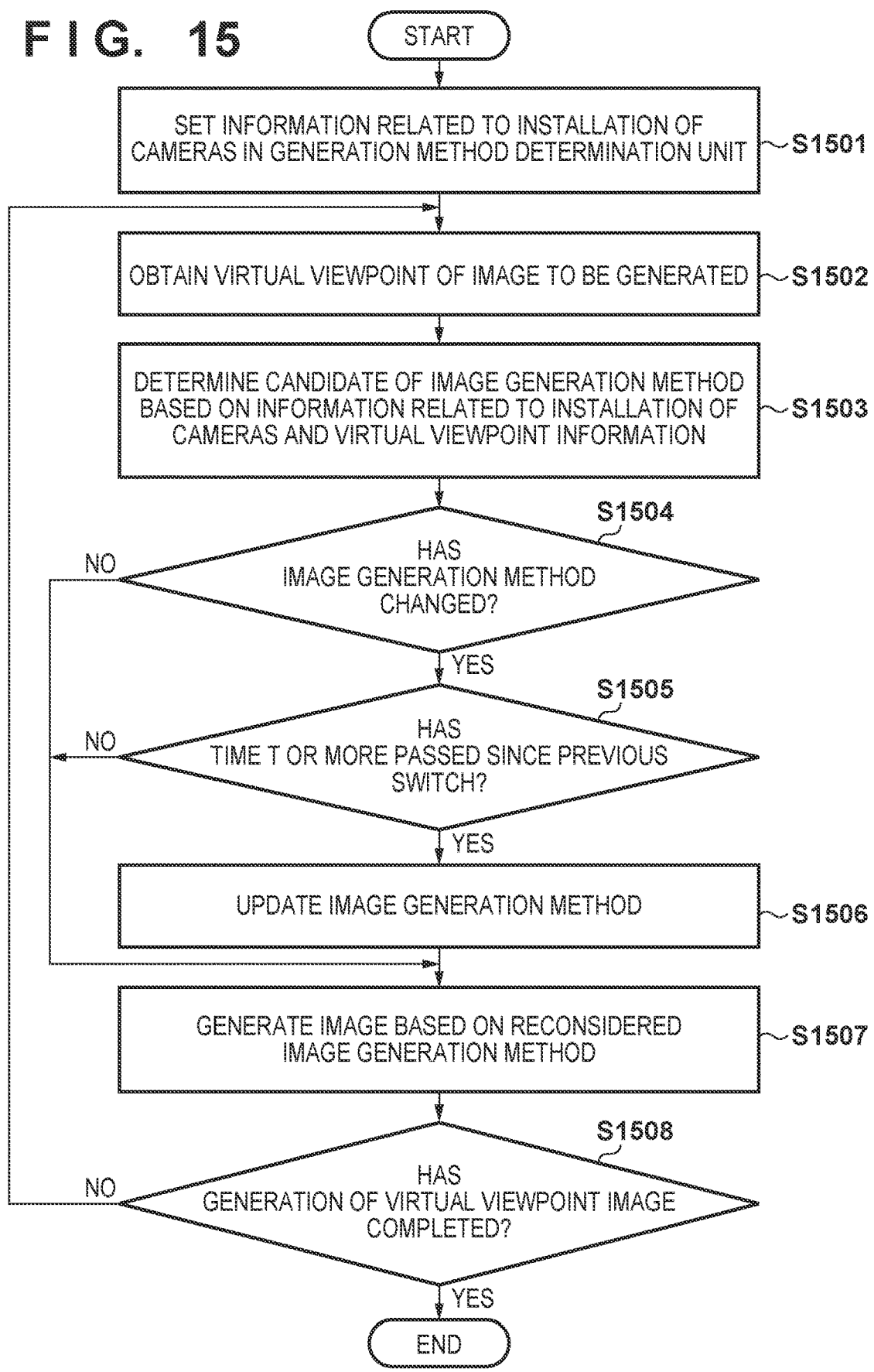
FIG. 15 is a flowchart for explaining a virtual viewpoint image generation processing according to the sixth embodiment.

Virtual viewpoint image generation processing according to the sixth embodiment will be described with reference to the flowchart of FIG. 15. In the sixth embodiment, the time at which the previous switching operation was performed is used as a parameter to control the timing to switch the image generation method. Note that the processes of steps S1501 to S1503 are similar to those of steps S301 to S303 of the first embodiment (FIG. 3).

In step S1504, it is determined whether the image generation method determined by the generation method determination unit 208 has changed from the image generation method currently used by an image generation unit 205. If it is determined that the image generation method has changed, the switching control unit 1401 obtains, in step S1505, the difference (elapsed time) from the time at which the image generation method was changed previously, and compares this difference with a threshold T. If the difference is equal to or greater than the threshold T, the switching control unit updates, in step S1506, the image generation method to be used for the virtual viewpoint image generation to the image generation method determined in step S1503. If the difference is less than the threshold T, the process of step S1506 is skipped and the image generation method is not updated. In this manner, the image generation method is not changed until a predetermined time has elapsed from the time when the image generation method was previously changed.

After the setting of the image generation method has been completed as described above, in step S1507, the image generation unit 205 generates a virtual viewpoint image by using the set image generation method. In step S1508, it is determined whether the virtual viewpoint image generation has been completed. If the virtual viewpoint image generation has not been completed, the processes from step S1502 are repeated to continue the virtual viewpoint image generation. The process of step S1508 is similar to that of step S305.

As described above, according to the sixth embodiment, it possible to switch the image generation method at a suitable timing. As a result, for example, it is possible to prevent a state in which the image generation method is switched frequently, and it is possible to generate a virtual viewpoint image that has higher image quality and is easier to see.

Seventh Embodiment

The seventh embodiment will described an example in which an image generation method to be used is selected based on a virtual camera and information of a three-dimensional model included in the virtual camera. In addition, the seventh embodiment will describe an example in which an image generation method to be used is selected from a plurality of model-based rendering processes. More specifically, the rendering processing (model-based rendering) is switched so that the precision of the three-dimensional model to be used will change in accordance with the distance from the virtual camera to the three-dimensional model. The system arrangement and the functional blocks according to the seventh embodiment are similar to those of the first embodiment (FIGS. 1 and 2). The hardware arrangement of an image computing server 122 is also similar to that described in FIG. 16. In addition, in the seventh embodiment, assume that the shape of a three-dimensional model is expressed by a plurality of dots and that the spacing (voxel size) between the dots forming the three-dimensional model is 5 mm.

Figure 17:
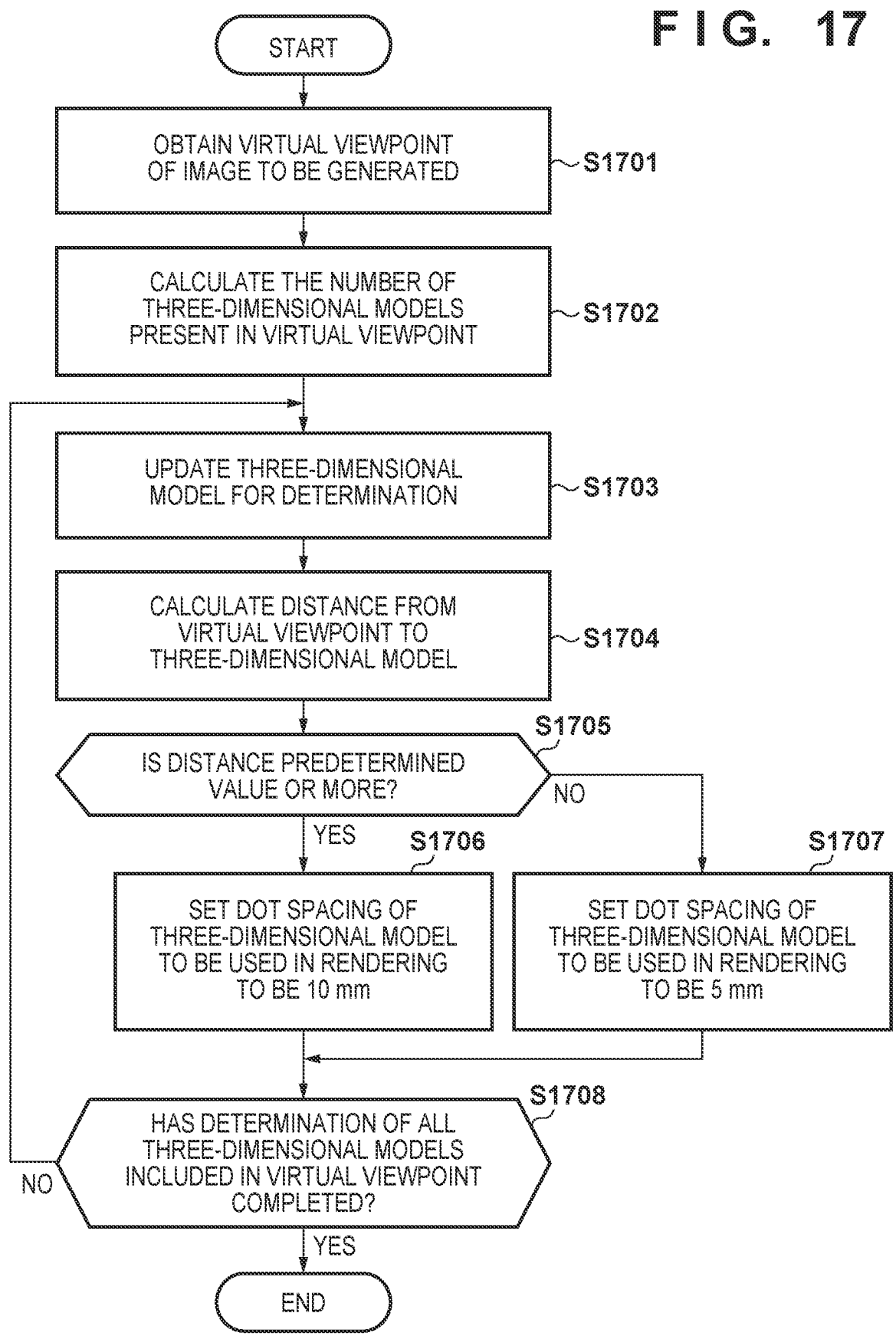
FIG. 17 is a flowchart showing three-dimensional model processing when a virtual viewpoint image is to be generated.

The selection of an image generation method according to this embodiment will be described with reference to the flowchart of FIG. 17. FIG. 17 is a flowchart for explaining three-dimensional model processing performed when one frame of a virtual viewpoint image is to be generated.

In step S1701, a viewpoint information obtainment unit 209 obtains the virtual viewpoint of an image to be generated. Next, in step S1702, a generation method determination unit 208 obtains the number of three-dimensional models which is the number of objects included in the virtual viewpoint. The processes of steps S1703 to S1707 are processes to be performed for each three-dimensional model, and are performed for all of the three-dimensional models included in the virtual viewpoint.

In step S1703, the generation method determination unit 208 specifies a generation method determination target three-dimensional model. In step S1704, the generation method determination unit 208 calculates the distance from the virtual viewpoint to the three-dimensional model specified in step S1703. More specifically, for example, the generation method determination unit obtains the distance from the center coordinates of the virtual viewpoint to a representative point (for example, the center of gravity) of the three-dimensional model. However, note that the definition of the distance is not limited to the above example. In step S1705, the generation method determination unit 208 compares the distance calculated in step S1704 with a predetermined value. If the calculated distance is equal to or more than the predetermined value, the process shifts to step S1706. If the calculated distance is less than the predetermined value, the process shifts to step S1707.

In steps S1706 and S1707, the dot spacing (voxel size) of the three-dimensional model to be used in the rendering of the virtual viewpoint image is set. The dot spacing of the three-dimensional model is a parameter related to the coarseness of the three-dimensional model, and a wider dot spacing will result in a coarser three-dimensional model. If the distance from the virtual viewpoint to the three-dimensional model is equal to or more than the predetermined value (YES in step S1705), the dot spacing of the three-dimensional model to be used in the rendering will be set to a wide dot spacing of 10 mm (step S1706). On the other hand, if the distance from the virtual viewpoint to the three-dimensional model is less than the predetermined value (NO in step S1705), the dot spacing of the three-dimensional model to be used in the rendering will be set to a narrow dot spacing of 5 mm (step S1707).

In step S1708, the generation method determination unit 208 determines whether processing has been performed on all of the three-dimensional models included in the virtual viewpoint. If there is an unprocessed three-dimensional model, the process returns to step S1703, and the above-described processes are repeated for the unprocessed three-dimensional model. On the other hand, the processing ends if it is determined that all of the three-dimensional models included in the virtual viewpoint have been processed. Subsequently, the generation method determination unit 208 notifies an image generation unit 205 of the dot spacing determined for each three-dimensional model. The image generation unit 205 executes model-based rendering by using the designated dot spacing of each three-dimensional model to perform object rendering.

An auxiliary explanation to the processing performed in accordance the flowchart of FIG. 17 will be additionally described with reference to FIG. 18. In 18A of FIG. 18, reference numeral 1801 denotes a sectional view (sectional view of a rectangular prism) of a three-dimensional model formed by dots, and the dot spacing is 5 mm. 18B shows a case in which the distance is short from the virtual viewpoint. This corresponds to a case in which the distance is determined to be shorter than the predetermined value (NO in step S1705) in step S1705 of the flowchart of FIG. 17. Since the three-dimensional model to be projected to the virtual viewpoint surface will be large when the distance is short, the precision of the dots to be used needs to be increased. Hence, the dot spacing of the three-dimensional model is set to 5 mm.

Figure 18:
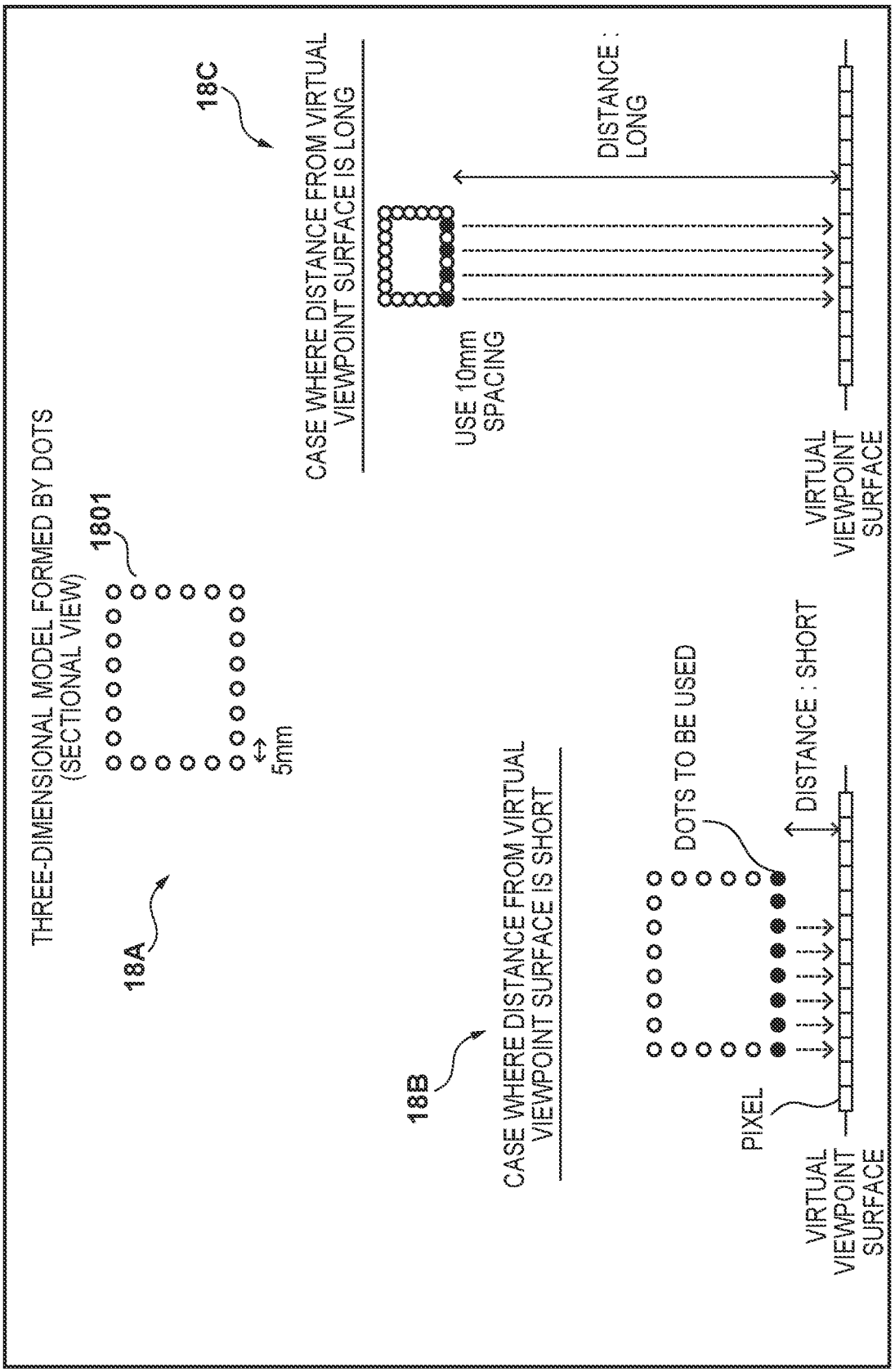
FIG. 18 is a view for explaining the dot spacing of a three-dimensional model.

18C of FIG. 18 shows a case in which the distance from the virtual viewpoint is long. This corresponds to a case in which the distance is determined to be equal to or more than a predetermined value (YES in step S1705) in step S1705 of FIG. 17. Since the three-dimensional model to be projected to the virtual viewpoint surface will become small when the distance is long, the influence on the image quality of an image which is to be actually generated will be small even if the precision of the dots to be used is lowered. In the example shown in 18C of FIG. 18, the dot spacing of the three-dimensional model is set to 10 mm. It is possible to reduce the processing amount while suppressing the influence on the image quality by increasing/decreasing the number of dots to be processed in accordance with the distance between the virtual viewpoint and the three-dimensional model in this manner. Therefore, stable generation of a virtual viewpoint image is possible.

As described above, according to the seventh embodiment, since the precision (dot spacing) of the three-dimensional model to be used is changed in accordance with the distance to the three-dimensional model included in the virtual camera, a stable virtual viewpoint image can be generated while maintaining the image quality.

Note that although the seventh embodiment described a method in which the rendering method to be used in image generation is switched among a plurality of model-based rendering methods, the present invention is not limited to this. For example, a method in which the rendering method to be used in image generation is switched among a plurality of image-based rendering methods may also be considered. More specifically, the number of camera images (captured images) to be used in the image-based rendering method may be switched. For example, in a case in which the angle difference between the image capturing direction of a given camera and the line-of-sight direction of a virtual viewpoint is small, rendering can be performed by using only the camera images obtained by this camera. On the other hand, in a case in which the line-of-sight direction of the virtual viewpoint is near the center of the image capturing directions of two adjacent cameras, rendering can be performed by using an image obtained by combining the camera images of these two cameras. That is, the number of camera images to be used for rendering may be increased/decreased in accordance with the relationship of the virtual viewpoint and the camera arrangement. In addition, for example, the number of camera images to be used for rendering may be increased/decreased in accordance with the distance from a virtual viewpoint to an object. More specifically, in a case in which the distance from the virtual viewpoint to the object is short, rendering can be performed to generate a virtual viewpoint image with high image quality by using an image obtained by combining the camera images of a plurality of cameras which are positioned near the virtual viewpoint. On the other hand, in a case in which the distance from the virtual viewpoint to the object is long, rendering can be performed by using an image obtained by performing projective transformation on a camera image captured by a single camera to simplify the processing.

Furthermore, if it is determined that model-based rendering is to be used in the methods described in the first to sixth embodiments, it may be arranged so that the dots of a three-dimensional model to be used for image generation will be further selected by the method described in the seventh embodiment. In the same manner, if it is determined that image-based rendering is to be used in the methods described in the first to sixth embodiments, it may be arranged so that the number of camera images to be used for image generation will be further adjusted by the method described in the seventh embodiment.

Eighth Embodiment

The eighth embodiment will describe an example in which a user selects an arbitrary image generation method from a plurality of image generation methods. The virtual viewpoint image generation methods have different characteristics depending on the respective schemes. For example, although model-based rendering is capable of generating a smooth image because it is a rendering operation that uses a three-dimensional model, the fineness of the resolution may be lost depending on the precision of the three-dimensional model to be generated. On the other hand, although image-based rendering has no smoothness, it tends to increase the sharpness of a virtual viewpoint image because an image will be directly converted and used. The characteristic of the virtual viewpoint image to be generated varies depending on the difference between the image generation methods in this manner. The eighth embodiment will describe an arrangement that allows the user to determine the image generation method of a virtual viewpoint image depending on the user's preference.

Figure 2:
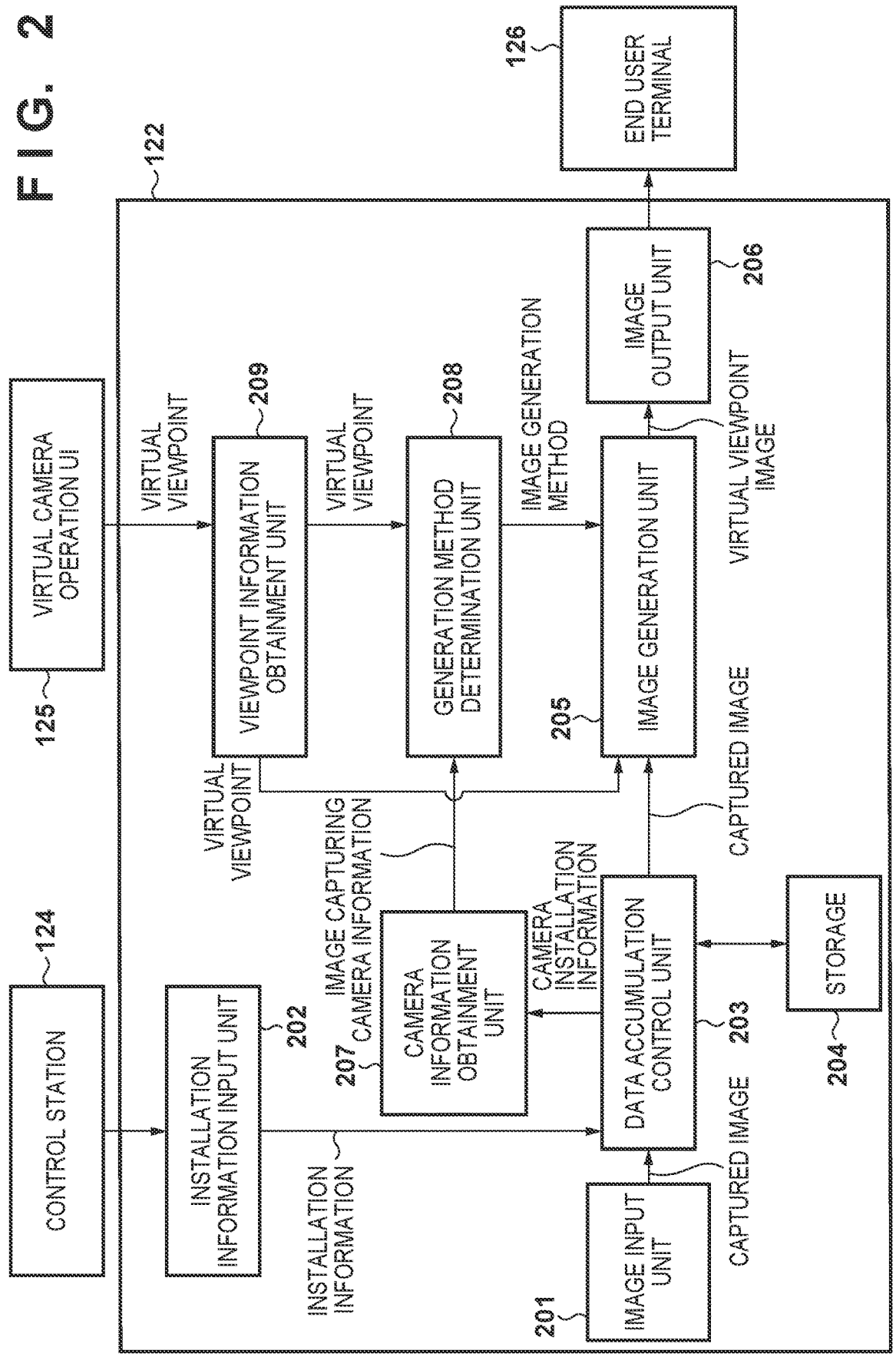
FIG. 2 is a block diagram for explaining functional blocks according to the first embodiment.

The system arrangement and the functional blocks according to the eighth embodiment are similar to those of the first embodiment (FIGS. 1 and 2). In addition, the hardware arrangement of an image computing server 122 is similar to that described in FIG. 16.

Figure 19:
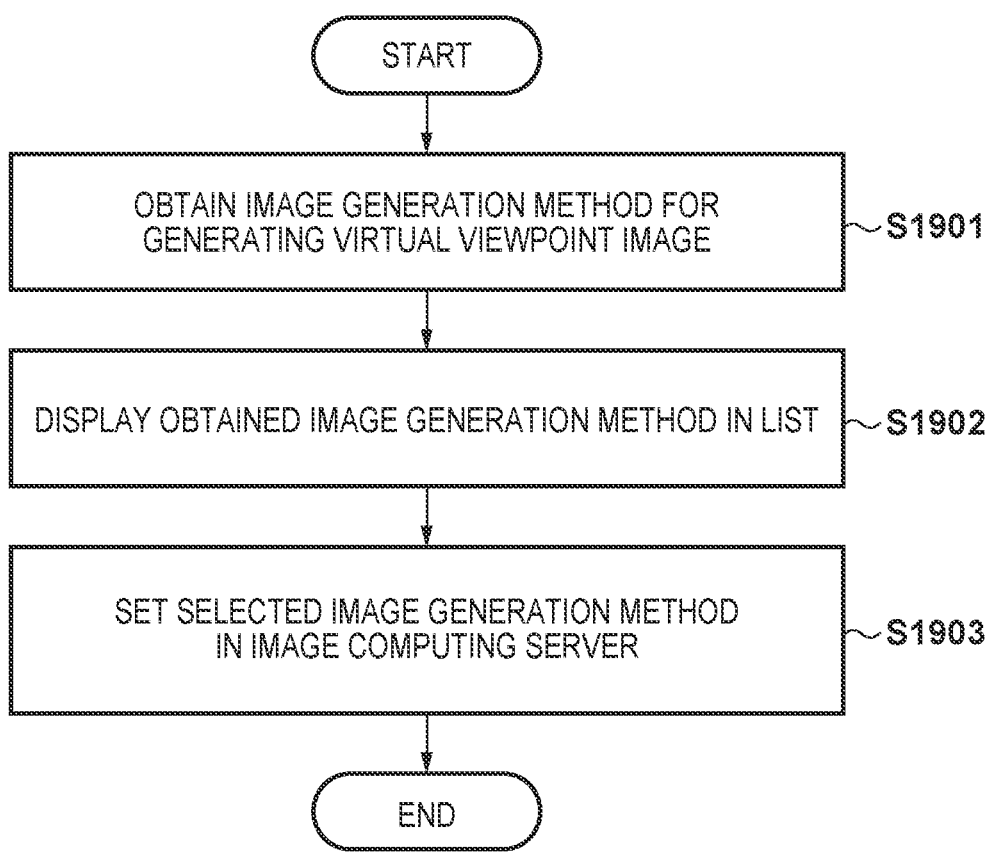
FIG. 19 is a flowchart for showing processing to cause a user to select a virtual viewpoint image generation method.

Processing according to the eighth embodiment will be described with reference to the flowchart of FIG. 19. FIG. 19 is a flowchart for explaining processing performed when a virtual viewpoint image generation method is to be selected.

In step S1901, a virtual camera operation UI 125 obtains the information of virtual viewpoint image generation methods that can be executed by the image computing server 122. For example, if the user makes an instruction on the virtual camera operation UI 125 to manually select an image generation method, an image generation method obtainment instruction is issued from the virtual camera operation UI 125 to the image computing server 122. In response to this obtainment instruction, the image computing server 122 notifies the virtual camera operation UI 125 of the image generation methods selectable by a generation method determination unit 208. Note that the image generation methods to be obtained in step S1901 can include a plurality of model-based rendering methods and a plurality of image-based rendering methods.

In step S1902, the virtual camera operation UI 125 displays a list of the image generation methods obtained in step S1901. When an operator who is operating the virtual camera operation UI 125 selects a desired image generation method from the list displayed in step S1902, the virtual camera operation UT 125 notifies, in step S1903, the image computing server 122 of the selected image generation method. The generation method determination unit 208 sets the notified image generation method as the image generation method to be used by an image generation unit 205.

As described above, according to the eighth embodiment, the user himself/herself can select the method for generating a virtual viewpoint image. This embodiment allows a virtual viewpoint image that corresponds to the user's preference to be generated.

Note that the processing described in FIG. 19 can be performed at an arbitrary timing. For example, it can be performed as initial processing for generating a virtual viewpoint image or performed to change the setting in the middle of a virtual viewpoint image generation operation.

In addition, although it was described in the eighth embodiment that the image generation method selection options are to be displayed in a list format, the present invention is not limited to this.

In addition, it goes without saying that the arrangements of the first to eighth embodiments described above can be combined as needed.

According to the present invention, an image generation method suitable for generating a virtual viewpoint image based on a virtual viewpoint can be determined. As a result, it is possible to generate a virtual viewpoint image with high image quality even when the position of the virtual viewpoint has changed.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™)), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present invention is not limited to the above-described embodiments, and various changes and modifications can be made within the spirit and scope of the present invention. Therefore, to apprise the public of the scope of the present invention, the following claims are made.

The invention claimed is:

1. An image processing apparatus comprising:
one or more memories storing instructions; and
one or more processors executing the instructions to:
obtain viewpoint information for specifying a position of a virtual viewpoint and a view direction from the virtual viewpoint;
obtain imaging apparatus information for specifying positions and image capturing directions of the plurality of imaging apparatuses;
determine, from a plurality of image processing methods including a first image processing method for generating a virtual viewpoint image using a three-dimensional model generated based on a plurality of captured images obtained by a plurality of imaging apparatuses and a second image processing method for generating a virtual viewpoint image based on transformation of at least one of the plurality of captured images, based on the obtained viewpoint information and the obtained imaging apparatus information, an image processing method to be used for generating a virtual viewpoint image corresponding to the position of the virtual viewpoint and the view direction from the virtual viewpoint specified based on the obtained viewpoint information; and
output a virtual viewpoint image generated based on the determined image processing method,
wherein, in a case where (i) the view direction from virtual viewpoint is different from any of the image capturing directions of the plurality of imaging apparatuses or the position of virtual viewpoint is different from any of the positions of the plurality of imaging apparatuses and (ii) an angle formed by the view direction from the virtual viewpoint and an image capturing direction of a specific imaging apparatus in the plurality of imaging apparatuses is smaller than a value, the second image processing method for generating the virtual viewpoint image based on the transformation of an image captured by the specific imaging apparatus is determined as the image processing method to be used for generating the virtual viewpoint image corresponding to the position of the virtual viewpoint and the view direction from the virtual viewpoint, and
wherein, in a case where (i) the view direction from virtual viewpoint is different from any of the image capturing directions of the plurality of imaging apparatuses or the position of virtual viewpoint is different from any of the positions of the plurality of imaging apparatuses and (ii) an angle formed by the view direction from the virtual viewpoint and any of the image capturing directions of the plurality of imaging apparatuses is not smaller than the value, the first image processing method for generating the virtual viewpoint image using the three-dimensional model is determined as the image processing method to be used for generating the virtual viewpoint image corresponding to the position of the virtual viewpoint and the view direction from the virtual viewpoint.

2. The image processing apparatus according to claim 1, wherein the imaging apparatus information further includes information for specifying an angle of view of an imaging apparatus.

3. The image processing apparatus according to claim 1, wherein the image processing method is determined based on a relationship between a field of view of the virtual viewpoint specified based on the obtained viewpoint information and a gaze point region included in an image capturing range of a plurality of imaging apparatuses specified based on the obtained imaging apparatus information.

4. The image processing apparatus according to claim 3, wherein the first image processing method is determined as the image processing method to be used for generating the virtual viewpoint image in a case where a ratio occupied by the gaze point region in the field of view of the virtual viewpoint is larger than a predetermined value and the second image processing method is determined as the image processing method to be used for generating the virtual viewpoint image in a case where the ratio is not larger than the predetermined value.

5. The image processing apparatus according to claim 1, wherein the image processing method is determined based on a change in the virtual viewpoint specified based on the obtained viewpoint information.

6. The image processing apparatus according to claim 5, wherein the first image processing method is determined as the image processing method to be used for generating the virtual viewpoint image in a case where the change in the virtual viewpoint corresponds to an arc-shaped movement.

7. The image processing apparatus according to claim 1, wherein the image processing method is determined based on a type of an object included in a field of view of a virtual viewpoint specified based on the obtained viewpoint information.

8. The image processing apparatus according to claim 7, wherein the first image processing method is determined as the image processing method to be used for generating the virtual viewpoint image in a case where the object is a person and the second image processing method is determined as the image processing method to be used for generating the virtual viewpoint image in a case where the object is an object having a simple shape.

9. The image processing apparatus according to claim 1, wherein the one or more processors further executes the instructions to determine not less than two image processing methods from the plurality of image processing methods, and
a virtual viewpoint image selected from not less than two virtual viewpoint images generated based on the not less than two image processing methods is output.

10. The image processing apparatus according to claim 9, wherein the not less than two virtual viewpoint images comprise a first virtual viewpoint image having first image quality and a second virtual viewpoint image having second image quality higher than the first image quality, and
wherein the second virtual viewpoint image is output.

11. The image processing apparatus according to claim 1, wherein the image processing method is determined so the image processing method will not be newly changed until a predetermined time has elapsed since the image processing method is changed.

12. The image processing apparatus according to claim 1, wherein the image processing method is determined based on a coarseness of a three-dimensional model to be used in the first image processing method.

13. The image processing apparatus according to claim 1, wherein the image processing method is determined based on the number of captured images to be used in the second image processing method.

14. An image processing method comprising:
obtaining viewpoint information for specifying a position of a virtual viewpoint and a view direction from the virtual viewpoint;
obtaining imaging apparatus information for specifying positions and image capturing directions of the plurality of imaging apparatuses;
determining, from a plurality of image processing methods including a first image processing method for generating a virtual viewpoint image using a three-dimensional model generated based on a plurality of captured images obtained by a plurality of imaging apparatuses and a second image processing method for generating a virtual viewpoint image based on transformation of at least one of the plurality of captured images, based on the obtained viewpoint information and the obtained imaging apparatus information, an image processing method to be used for generating a virtual viewpoint image corresponding to the position of the virtual viewpoint and the view direction from the virtual viewpoint specified based on the obtained viewpoint information; and
outputting a virtual viewpoint image generated based on the determined image processing method,
wherein, in a case where (i) the view direction from virtual viewpoint is different from any of the image capturing directions of the plurality of imaging apparatuses or the position of virtual viewpoint is different from any of the positions of the plurality of imaging apparatuses and (ii) an angle formed by the view direction from the virtual viewpoint and an image capturing direction of a specific imaging apparatus in the plurality of imaging apparatuses is smaller than a value, the second image processing method for generating the virtual viewpoint image based on the transformation of an image captured by the specific imaging apparatus is determined as the image processing method to be used for generating the virtual viewpoint image corresponding to the position of the virtual viewpoint and the view direction from the virtual viewpoint, and
wherein, in a case where (i) the view direction from virtual viewpoint is different from any of the image capturing directions of the plurality of imaging apparatuses or the position of virtual viewpoint is different from any of the positions of the plurality of imaging apparatuses and (ii) an angle formed by the view direction from the virtual viewpoint and any of the image capturing directions of the plurality of imaging apparatuses is not smaller than the value, the first image processing method for generating the virtual viewpoint image using the three-dimensional model is determined as the image processing method to be used for generating the virtual viewpoint image corresponding to the position of the virtual viewpoint and the view direction from the virtual viewpoint.

15. A non-transitory computer-readable storage medium storing a program for causing a computer to execute an image processing method comprising:
obtaining viewpoint information for specifying a position of a virtual viewpoint and a view direction from the virtual viewpoint;
obtaining imaging apparatus information for specifying positions and image capturing directions of the plurality of imaging apparatuses;
determining, from a plurality of image processing methods including a first image processing method for generating a virtual viewpoint image using a three-dimensional model generated based on a plurality of captured images obtained by a plurality of imaging apparatuses and a second image processing method for generating a virtual viewpoint image based on transformation of at least one of the plurality of captured images, based on the obtained viewpoint information and the obtained imaging apparatus information, an image processing method to be used for generating a virtual viewpoint image corresponding to the position of the virtual viewpoint and the view direction from the virtual viewpoint specified based on the obtained viewpoint information; and
outputting a virtual viewpoint image generated based on the determined image processing method,
wherein, in a case where (i) the view direction from virtual viewpoint is different from any of the image capturing directions of the plurality of imaging apparatuses or the position of virtual viewpoint is different from any of the positions of the plurality of imaging apparatuses and (ii) an angle formed by the view direction from the virtual viewpoint and an image capturing direction of a specific imaging apparatus in the plurality of imaging apparatuses is smaller than a value, the second image processing method for generating the virtual viewpoint image based on the transformation of an image captured by the specific imaging apparatus is determined as the image processing method to be used for generating the virtual viewpoint image corresponding to the position of the virtual viewpoint and the view direction from the virtual viewpoint, and wherein, in a case where (i) the view direction from virtual viewpoint is different from any of the image capturing directions of the plurality of imaging apparatuses or the position of virtual viewpoint is different from any of the positions of the plurality of imaging apparatuses and (ii) an angle formed by the view direction from the virtual viewpoint and any of the image capturing directions of the plurality of imaging apparatuses is not smaller than the value, the first image processing method for generating the virtual viewpoint image using the three-dimensional model is determined as the image processing method to be used for generating the virtual viewpoint image corresponding to the position of the virtual viewpoint and the view direction from the virtual viewpoint.

\* \* \* \* \*